US010862645B2

(12) United States Patent
Davydov et al.

(10) Patent No.: US 10,862,645 B2
(45) Date of Patent: *Dec. 8, 2020

(54) METHODS, APPARATUSES, AND SYSTEMS FOR MULTI-POINT, MULTI-CELL SINGLE-USER BASED MULTIPLE INPUT AND MULTIPLE OUTPUT TRANSMISSIONS

(71) Applicant: Apple Inc., Cupertino, CA (US)

(72) Inventors: Alexei Davydov, Nizhny Novgorod (RU); Gregory Morozov, Nizhny Novgorod (RU); Vadim Sergeyev, Nizhny Novgorod (RU); Alexander Maltsev, Nizhny Novgorod (RU); Ilya Bolotin, Nizhny Novgorod (RU)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/408,107

(22) Filed: May 9, 2019

(65) Prior Publication Data
US 2019/0372731 A1 Dec. 5, 2019

Related U.S. Application Data

(63) Continuation of application No. 15/873,629, filed on Jan. 17, 2018, now Pat. No. 10,326,575, which is a
(Continued)

(51) Int. Cl.
H04L 5/00 (2006.01)
H04W 72/04 (2009.01)
(Continued)

(52) U.S. Cl.
CPC ........... H04L 5/0048 (2013.01); H04B 7/024 (2013.01); H04B 7/0413 (2013.01); H04W 72/042 (2013.01)

(58) Field of Classification Search
CPC ... H04L 5/0048; H04L 5/0035; H04L 5/0051; H04L 1/0026; H04L 25/0224; H04L 5/00;
(Continued)

(56) References Cited

U.S. PATENT DOCUMENTS 9,906,344 B2 2/2018 Davydov et al.
10,015,031 B2 7/2018 Yi et al.
(Continued)

FOREIGN PATENT DOCUMENTS

CN 103391577 11/2013
CN 103561475 2/2014
(Continued)

OTHER PUBLICATIONS

3 GPP TS 36.213; V11.1.0 release 11 "physical layer procedures; 2012";160 pages.*

(Continued)

Primary Examiner — Rahel Guarino
(74) Attorney, Agent, or Firm — Fish & Richardson P.C.

(57) ABSTRACT

Methods, systems, and storage media for providing multi-cell, multi-point single user (SU) multiple input and multiple output (MIMO) operations are described. In embodiments, an apparatus may receive and process a first set of one or more independent data streams received in a downlink channel from a first transmission point. The apparatus may receive and process a second set of one or more independent data streams received in a downlink channel from a second transmission point. The apparatus may process control information received from the first transmission point or the second transmission point. The control information may include an indication of a quasi co-location assumption to be used for estimating channel characteristics for reception of the first set of one or more independent data streams or the
(Continued)

second set of one or more independent data streams. Other embodiments may be described and/or claimed.

25 Claims, 8 Drawing Sheets

Related U.S. Application Data continuation of application No. 14/928,759, filed on Oct. 30, 2015, now Pat. No. 9,906,344.

(60) Provisional application No. 62/119,386, filed on Feb. 23, 2015, provisional application No. 62/147,972, filed on Apr. 15, 2015.

(51) Int. Cl.
*H04B 7/0413* (2017.01)
*H04B 7/024* (2017.01)

(58) Field of Classification Search
CPC ..... H04L 27/26; H04L 27/2601; H04B 7/024; H04B 7/0697; H04B 7/0413; H04B 17/309; H04B 7/0452; H04B 17/318; H04B 7/0684; H04B 7/04; H04B 7/02; H04W 72/042; H04W 88/02; H04W 48/12; H04W 72/04
See application file for complete search history.

(56) References Cited

U.S. PATENT DOCUMENTS

| | | | | |
|---|---|---|---|---|
| 2012/0170525 | A1* | 7/2012 | Sorrentino | H04L 5/0023 370/329 |
| 2013/0279437 | A1* | 10/2013 | Ng | H04L 27/2665 370/329 |
| 2015/0029966 | A1 | 1/2015 | Park et al. | |
| 2015/0173102 | A1* | 6/2015 | Ruiz Delgado | H04L 1/1864 370/280 |
| 2015/0207601 | A1* | 7/2015 | Kim | H04L 5/0048 370/329 |
| 2015/0249517 | A1 | 9/2015 | Seo et al. | |
| 2015/0312927 | A1 | 10/2015 | Ko et al. | |
| 2015/0349940 | A1 | 12/2015 | Kim et al. | |
| 2016/0112099 | A1 | 4/2016 | Lee et al. | |
| 2016/0174247 | A1 | 6/2016 | Ruiz et al. | |
| 2016/0233986 | A1 | 8/2016 | Lee et al. | |
| 2017/0195934 | A1 | 7/2017 | Kang et al. | |

FOREIGN PATENT DOCUMENTS

| | | |
|---|---|---|
| CN | 104137440 | 11/2014 |
| CN | 104365045 | 2/2015 |
| KR | 20140041359 A | 4/2014 |
| WO | 2014025139 A1 | 2/2014 |
| WO | 2014042378 A2 | 3/2014 |
| WO | WO 2014054904 | 4/2014 |

OTHER PUBLICATIONS

"3 GPP TS 36.211; V11.1.0" release 11 physical layer procedures;Dec. 2012; 108 page.*
3 GPP TS 36.213; V11.1.0 release 11 "physical layer procedures; 2012";160 pages. (Year: 2012).*
"3 GPP TS 36.211; V11.1.0" release 11 physical layer procedures;Dec. 2012; 108 pages (Year: 2012).*
International Search Report and Written Opinion dated Mar. 17, 2016 from International Application No. PCT/US2016/014360, 17 pages.
Pantech, "Discussion on QCL definition in TM10 on NCT," 3GPP TSG RAN1 #74, R1-133441, Oct. 19-Oct. 23, 2013 Barcelona, Spain, 2 pages.
QUALCOMM Incorporated, "Detailed design of DRS," 3GPP TSG-RAN WG1 #78, R1-142946, Agenda item: 7.2.1.2.2, Aug. 18-Aug. 22, 2014, Dresden, Germany, 2 pages.
3GPP, "Technical Specification Group Radio Access Network; Evolved Universal Terrestrial Radio Access (E-UTRA); Physical Channels and Modulation (Release 11)," 3GPP TS 36.211 V11.1.0 (Dec. 2012), LTE Advanced, 108 pages.
3GPP, "Technical Specification Group Radio Access Network; Evolved Universal Terrestrial Radio Access (E-UTRA); Multiplexing and channel coding (Release 11)," 3GPP TS 36.212 V11.1.0 (Dec. 2012), LTE Advanced, 82 pages.
3GPP, "Technical Specification Group Radio Access Network; Evolved Universal Terrestrial Radio Access (E-UTRA); Physical layer procedures (Release 11)," 3GPP TS 36.213 V11.1.0 (Dec. 2012), LTE Advanced, 42 pages.
3GPP, "Technical Specification Group Radio Access Network; Evolved Universal Terrestrial Radio Access (E-UTRA); Physical layer procedures (Release 11)," 3GPP TS 36.213 V11.1.0 (Dec. 2012), LTE Advanced, 160 pages (OA dated Jan. 9, 2017).
Office Action dated Jan. 9, 2017 from U.S. Appl. No. 14/928,759, 27 pages.
Final Office Action dated Jul. 28, 2017 from U.S. Appl. No. 14/928,759, 20 pages.
European Patent Office—Article 94(3) dated Aug. 30, 2018 from European Patent Application No. 16704302.5, 7 pages.
3GPP, "Technical Specification Group Radio Access Network; Evolved Universal Terrestrial Radio Access (E-UTRA); Physical layer procedures (Release 11)," 3GPP TS 36.213 V11.3.0 (Dec. 2012), LTE Advanced, 40 pages (FOA dated Nov. 29, 2018).
EP Office Action in European Appln. No. 16704302.5, dated Oct. 4, 2019, 9 pages.
PCT International Preliminary Report on Patentability in International Appln. No. PCT/US2016/014360, dated Aug. 29, 2017, 11 pages.

* cited by examiner

METHODS, APPARATUSES, AND SYSTEMS FOR MULTI-POINT, MULTI-CELL SINGLE-USER BASED MULTIPLE INPUT AND MULTIPLE OUTPUT TRANSMISSIONS

RELATED APPLICATIONS

The present application is a continuation of U.S. patent application Ser. No. 15/873,629, filed Jan. 17, 2018, and entitled "METHODS, APPARATUSES, AND SYSTEMS FOR MULTI-POINT, MULTI-CELL SINGLE-USER BASED MULTIPLE INPUT AND MULTIPLE OUTPUT TRANSMISSIONS," which is a continuation of U.S. patent application Ser. No. 14/928,759, filed Oct. 30, 2015, which is now registered as U.S. Pat. No. 9,906,344 on Feb. 27, 2018, which claims priority under 35 U.S.C. § 119 to U.S. Provisional Application No. 62/119,386, filed on Feb. 23, 2015, and to U.S. Provisional Application No. 62/147,972, filed on Apr. 15, 2015, both of each of which are hereby incorporated by reference in their entireties.

FIELD

Implementations of the claimed invention generally relate to the field of wireless communications, and in particular, providing downlink channels from neighboring transmission points in Long Term Evolution (LTE) wireless communications networks.

BACKGROUND

Current wireless communication standards are based on antenna configurations including two transmission antenna elements (referred to as "2Tx antennas") based in part on current deployment assumptions that typically rely on 2Tx antennas at an evolved node B (eNB). Many eNBs are likely to continue to include 2Tx antennas (referred to as "2Tx eNBs") in the near future due to high costs associated with network deployment of eNBs with four antennas elements (4Tx) or eight antennas elements (8Tx). As a result, in conventional single-point, single-cell multiple input and multiple output (MIMO) transmission schemes, a maximum number of transmission layers that can be simultaneously transmitted to a user equipment (UE) is usually limited to two transmission layers. Thus, in many cases, a UE is only able to receive two downlink transmissions from a serving eNB regardless of the reception capabilities of the UE.

UEs including four reception antenna elements (referred to as "4Rx UEs") are being developed and will likely be deployed in the near future. Because most eNBs may still include 2Tx antennas, these 2Tx eNBs may not be capable of providing full utilization, in terms of the peak data rate enhancements, for the 4Rx UEs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
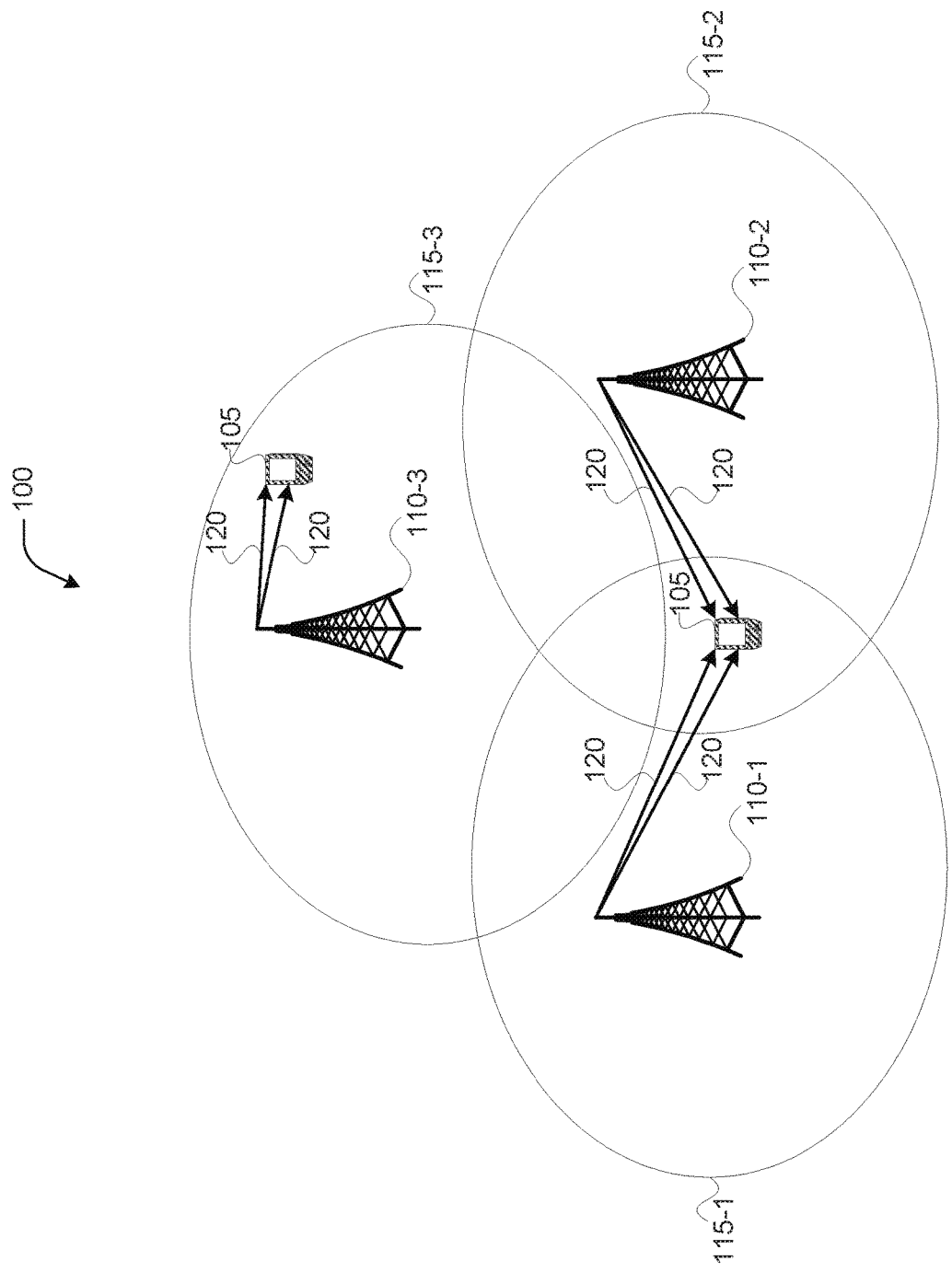
FIG. 1 illustrates a broadband wireless access (BWA) network in accordance with various example embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "user equipment" may be considered synonymous to, and may hereafter be occasionally referred to, as a client, mobile, mobile device, mobile terminal, user terminal, mobile unit, mobile station, mobile user, UE, subscriber, user, remote station, access agent, user agent, receiver, etc., and may describe a remote user of network resources in a communications network. Furthermore, the term "user equipment" may include any type of wireless/wired device such as consumer electronics devices, cellular phones, smartphones, tablet personal computers, wearable computing devices, personal digital assistants (PDAs), desktop computers, and laptop computers, for example.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), base transceiver station (BTS), access point (AP), etc., and may describe equipment that provides the radio baseband functions for data and/or voice connectivity between a network and one or more users.

It should also be noted that the term "channel" as used herein may refer to any transmission medium, either tangible or intangible, which is used to communicate data or a data stream. Additionally, the term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated.

Embodiments herein relate to facilitating multi-cell, multi-point single user (SU) multiple input and multiple output (MIMO) transmissions wherein multiple transmission layers are provided to a UE by a neighboring or non-serving cell or transmission point. The example embodiments provide the following advantages: a multi-cell, multi-point SU MIMO transmission scheme may improve throughput or data rates in dense deployment areas, such as an indoor environment or an relatively large urban environment; a multi-cell, multi-point SU MIMO transmission scheme may provide load balancing by allocating additional transmission resources to UEs from less loaded or under loaded transmission points; and currently deployed base stations (for example, eNBs) may not require upgrades to include additional transmission antenna elements, thereby saving network operator costs.

FIG. 1 illustrates an example of a broadband wireless access (BWA) network 100, according to an example embodiment. BWA network 100 includes two UEs 105, three eNBs 110 (eNB 110-1, eNB 110-2, and eNB 110-3 are collectively referred to as "eNB 110"), and three cells 115 (cell 115-1, cell 115-2, and cell 115-3 are collectively referred to as "cell 115"). The following description is provided for an example BWA network 100 that operates in conjunction with the Long Term Evolution (LTE) standard as provided by 3rd Generation Partnership Project (3GPP) technical specifications. However, the example embodiments are not limited in this regard and the described embodiments may apply to other networks that benefit from the principles described herein.

Referring to FIG. 1, each of the UEs 105 (collectively referred to as "UE 105") may be physical hardware devices capable of running one or more applications and capable of accessing network services via a radio link ("link") with an eNB 110. UE 105 may include a transmitter/receiver (or alternatively, a transceiver), memory, one or more processors, and/or other like components. According to various embodiments, UE 105 may include four reception antenna elements (referred to as a "4Rx UE 105"). UE 105 may be configured to send/receive data to/from the eNB 110 via the link. UE 105 may be designed to sequentially and automatically carry out a sequence of arithmetic or logical operations; equipped to record/store digital data on a machine readable medium; and transmit and receive digital data via eNB 110. The wireless transmitter/receiver (or alternatively, a transceiver) included in the UE 105 may be configured to operate in accordance with one or more wireless communications protocols and/or one or more cellular phone communications protocols, such as 3GPP LTE, 3GPP LTE-Advanced (LIE-A), and/or any other wireless communication protocols, including radio frequency (RF)-based, optical (visible/invisible), and so forth. In various embodiments, UE 105 may include wireless phones or smartphones, laptop personal computers (PCs), tablet PCs, wearable computing devices, autonomous sensors or other like machine type communication (MTC) devices, and/or any other physical or logical device capable of recording, storing, and/or transferring digital data to/from eNB 110 and/or any other like network element.

The eNB 110 is a hardware computing device configured to provide wireless communication services to mobile devices (for example, UEs 105) within a geographic area or cell 115 associated with an eNB 110 (for example, cell 115-1 associated with eNB 110-1). The cell 115 may also be referred to as a "serving cell," "cell coverage area," and the like. The eNB 110 may provide wireless communication services to UE 105 via one or more links 120 for each UE 105. As shown by FIG. 1, links 120 between eNB 110 and a UE 105 may include one or more downlink (or forward) channels for transmitting information from eNB 110 to UE 105. Although not shown by FIG. 1, links 120 may also include one or more uplink (or reverse) channels for transmitting information from UE 105 to the eNB 110. The channels may include the physical downlink shared channel (PDSCH), physical downlink control channel (PDCCH), physical hybrid automatic repeat request (HARD) indicator channel (PHICH), physical control format indicator channel (PCFICH), physical broadcast channel (PBCH), physical uplink shared channel (PUSCH), physical uplink control channel (PUCCH), physical random access channel (PRACH), and/or any other like communications channels or links used to transmit/receive data.

In various embodiments, eNBs 110 include a transmitter/receiver (or alternatively, a transceiver) connected to one or more antennas, one or more memory devices, one or more processors, and/or other like components. The one or more transmitters/receivers may be configured to transmit/receive data signals to/from one or more UEs 105 within its cell 115 via one or more links that may be associated with a transmitter and a receiver. The eNB 110 or a transmitter of an eNB 110 may be referred to as a "transmission point." In various embodiments, when BWA network 100 employs the LTE or LTE-A standard, eNBs 110 may employ Evolved Universal Terrestrial Radio Access (E-UTRA) protocols, for example, using orthogonal frequency-division multiple access (OFDMA) for downlink communications and single carrier frequency-division multiple access (SC-FDMA) for uplink communications.

In many deployment scenarios, such as BWA network 100, one or more of the eNBs 110 may only include two transmission antenna elements (referred to as a "2Tx eNB") due in part to the prohibitive costs associated with upgrading the eNBs 110 to include more than two transmission antennas. In conventional systems, each eNB 110 may only be capable of providing single-point, single-cell MIMO coverage for a UE 105, wherein only one serving cell 115 is able to provide downlink transmissions to a UE 105 (for example, eNB 110-3 serving a single UE 105 as shown by FIG. 1). According to various example embodiments, a UE 105 may receive transmission layers, not only from a serving cell 115, but also from one or more neighboring cells 115 that have available downlink resources. For example, as shown in FIG. 1, a serving 2Tx eNB 110-1 may transmit two transmission layers and a neighboring 2Tx eNB 110-2 having available downlink resources may also provide two transmission layers, such that a total transmit of four transmission layers are received by a 4Rx UE 105. By performing such transmissions, a UE 105 may boost a peak data rate by decoding up to four transmission layers at the same or similar time, where some of the layers are transmitted by a first service cell, for example, service cell 115-1, and other layers are transmitted by neighboring cells, for example, service cell 115-2. To spatially separate the multiple layers on the same frequency, the 4Rx UE 105 may use four reception antenna elements with a receiver capable of suppressing the interference from the interfering layers. Such receivers may be minimum mean square error interference rejection combining (MMSE-IRC) receivers, reduced complexity maximum likelihood (R-ML) receivers, symbol level interference cancellation (SLIC) or code-word interference cancellation (CWIC) receivers, and/or other like receivers. Furthermore, in some deployment scenarios, the number of layers from a single eNB 110 may be limited by propagation characteristics of a channel, for example, a line-of-sight, which may limit the number of MIMO layers to be transmitted to two MIMO layers. For example, in the BWA network 100, a serving eNB 110-1, which has more than two antenna elements, may only be able to transmit two transmission layers due to various propagation characteristics, and a neighboring eNB 110-2 having available downlink resources may also provide two transmission layers, such that a total transmit of four transmission layers are received by a 4Rx UE 105.

In other embodiments, the number of transmitted layers may be different on different transmission points or cells 115. For example, the eNB 110-1 may transmit two (spatial) transmission layers and the eNB 110-2 may transmit one transmission layer (not shown). In another example, the eNB 110-1 may transmit two spatial transmission layers, the eNB 110-2 may transmit one transmission layer, and the eNB 110-3 may transmit one transmission layer when the UE 105 is located in an area where all three of the cells 115 converge (not shown). Furthermore, although FIG. 1 shows three eNBs 110, the example embodiments provide that a neighboring cell may be provided by a small cell, such as a femtocell, picocell, or any other suitable network element. The aforementioned transmission schemes may be referred to as multi-cell, multi-point SU-MIMO transmission schemes.

Multi-point transmissions may refer to transmissions being carried out by multiple transmission points or cells 115. When multiple transmissions points coordinate with one another to provide multi-point transmissions, these transmission points are considered to be a part of a collaborative multipoint (CoMP) transmission scheme. Current CoMP transmission schemes include dynamic point selection and joint transmission. Dynamic point selection includes transmitting from a single transmission point, where the transmission point may be changed dynamically. Joint transmission (also referred to as "joint processing" and "cooperative MIMO") includes simultaneous transmissions from multiple transmission points, wherein each transmission point transmits on the same frequency in the same subframe based on relatively extensive backhaul communications between the transmission points. For most CoMP transmission schemes, it is typically assumed that a UE 105 receives all MIMO layers using quasi co-located UE-specific RS antenna ports, which implies that the precoding is performed jointly by all transmission points.

Antenna ports are logical entities distinguished by reference signal sequences. Multiple antenna port signals can be transmitted on a single physical transmit antenna element, and/or a single antenna port can be spread across multiple physical transmit antenna elements. Antenna ports 0-3 are indicated by or otherwise associated with cell-specific reference signals (CRSs), antenna ports 5 and 7-14 are indicated by or otherwise associated with UE-specific reference signals (UE-specific RSs) (also referred to as a demodulation reference signals (DMRSs)), and antenna ports 15-22 are indicated by or otherwise associated with channel state information reference signals (CSI-RSs). Current specifications delineate that UE-specific antenna ports used to transmit spatial layers are assumed to be quasi co-located with one another.

The term "quasi co-located" means that two or more antenna ports are said to be quasi co-located if large-scale properties of a channel over which a symbol on one antenna port is conveyed can be inferred from a channel over which a symbol on another antenna port is conveyed. The large-scale channel properties include one or more of delay spread, Doppler spread, Doppler shift, average gain, average delay, reception timing, and the like. When two antenna ports are quasi co-located, a UE 105 may assume that large-scale channel properties of a signal received from a first antenna port can be inferred from a signal received from a second antenna port. For example, when a UE 105 is to decode a received PDSCH transmission, the UE 105 may perform a channel estimation operation using an associated UE-specific RS. In order to perform the channel estimation operation, the UE 105 may need to know the large-scale channel properties for that channel. Using the quasi co-location (QCL) assumptions of the current standards, a UE 105 that is configured for transmission modes 1-9 may assume that, for a serving cell, CRS antenna ports, CSI-RS antenna ports, and UE-specific RS antenna ports are quasi co-located.

A UE 105 configured for transmission mode 10 may operate according to two QCL types, for example, type A and type B. When the UE 105 is configured as a type A UE, the UE 105 may assume that the CRS, UE-specific RS, and CSI-RS antenna ports are quasi co-located, which is the QCL assumption for transmission modes 1-9. When the UE 105 is configured as a type B UE, the UE 105 may assume the CSI-RS antenna ports corresponding to a CSI-RS resource configuration identified by higher-layer signaling (for example, a radio resource control (RRC) signaling) and the UE-specific RS antenna ports associated with the PDSCH are quasi co-located. For the UE 105 configured for transmission mode 10, the QCL type may be signaled to the UE 105 by higher-layer signaling (for example, RRC signaling). The QCL assumption of the current standards implies that all transmission layers are transmitted from the same transmission point, which means that only single-point, single-cell SU-MIMO is currently supported by the current standards.

In order to provide multi-cell, multi-point SU-MIMO, example embodiments provide that the current QCL assumptions for UE-specific RS are adjusted (or removed) in order to accommodate channel characteristics for different transmission layers being transmitted from different transmission points. In some embodiments, the QCL assumptions are adjusted only for UEs configured for transmission mode 10. Example embodiments provide for QCL assumption adjustments because channels associated with different transmission points may have different channel characteristics, and thus, time and frequency synchronization errors may occur if the UE 105 infers the channel properties derived from antenna ports used for transmissions from a first transmission point for antenna ports used for transmissions from a second transmission point.

Although not shown by FIG. 1, each eNB 110 may be part of a radio access network (RAN) or associated with a radio access technology (RAT). In embodiments where communications network 100 employs the LTE standard, the RAN may be referred to as an evolved universal terrestrial radio access network (E-UTRAN). RANs and their typical functionality are generally well-known, and thus, a further detailed description of the typical functionality of RAN is omitted. Furthermore, although not shown by FIG. 1, the BWA network 100 may include a core network (CN), which may include one or more hardware devices, such as the one or more servers. These servers may provide various telecommunications services to the UEs 105. In embodiments where BWA network 100 employs the LTE standards, the one or more servers of the CN may comprise components of the System Architecture Evolution (SAE) with an Evolved Packet Core (EPC) as described by 3GPP technical specifications. In such embodiments, the one or more servers of the CN may include components such as a node including a mobility management entity (MME) and/or a serving General Packet Radio Service Support Node (SGSN) (which may be referred to as an "SGSN/MME"), serving gateway (SGW), packet data network (PDN) gateway (PGW), home subscriber server (HSS), access network discovery and selection function (ANDSF), evolved packet data gateway (ePDG), an MTC interworking function (IWF), and/or other like components as are known. Because the components of the SAE core network and their functionality are generally well-known, a further detailed description of the SAE core network is omitted. It should also be noted that the aforementioned functions may be provided by the same physical hardware device or by separate components and/or devices.

Although FIG. 1 shows three cell coverage areas (for example, cells 115), three base stations (for example, eNBs 110), and two mobile devices (for example, UEs 105), it should be noted that in various example embodiments, BWA network 100 may include many more eNBs serving many more UEs than those shown in FIG. 1. However, it is not necessary that all of these generally conventional components be shown in order to understand the example embodiments as described herein.

Figure 2:
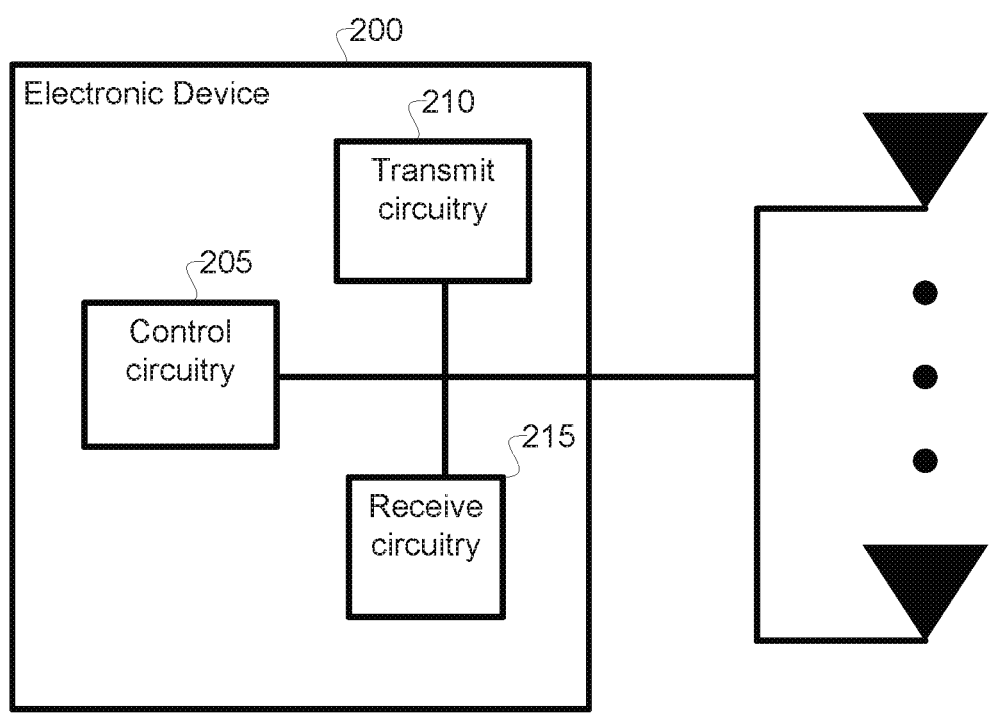
FIG. 2 illustrates the components of electronic device circuitry, such as user equipment (UE) circuitry and/or evolved node B (eNB) circuitry, in accordance with various example embodiments.

FIG. 2 illustrates the components of electronic device circuitry 200, which may be eNB circuitry, UE circuitry, or some other type of circuitry, in accordance with various embodiments. In embodiments, the electronic device circuitry may be, or may be incorporated into or otherwise a part of, a UE 105, an eNB 110, or some other type of electronic device. As shown, the electronic device circuitry 200 includes control circuitry 205, transmit circuitry 210, and receive circuitry 215.

According to various embodiments, the transmit circuitry 210 and the receive circuitry 215 may be coupled with one or more antennas to facilitate over-the-air transmissions with, for example, the eNB 110. For example, the transmit circuitry 210 may be configured to receive digital data from one or more components of eNB 110, and convert the received digital data into an analog signal for transmission over an air interface by way of the one or more antennas. The receive circuitry 215 may be any type of hardware device that can receive and convert a signal from a modulated radio wave into usable information, such as digital data. Receive circuitry 215 may be coupled with the one or more antennas in order to capture the radio waves. Receive circuitry 215 may be configured to send digital data converted from a captured radio wave to one or more other components of the UE 105. It should be noted that the transmit circuitry 210 and the receive circuitry 215 may be collectively referred to as "signal circuitry," "signaling circuitry," and the like. In embodiments, the transmit circuitry 210 and the receive circuitry 215 may be coupled to the control circuitry 205. In some embodiments where the electronic device circuitry 200 is a UE 105 or otherwise a part of a UE 105, the receive circuitry 215 may be a receiver or a part of a receiver, such as an MMSE-IRC receiver, an R-ML receiver, an SLIC or a CWIC receiver, and/or any other like suitable receiver. The control circuitry 205 may be configured to perform control operations described herein with respect to the UE 105 and/or the eNB 110. The components of the UE 105 circuitry may be configured to perform operations similar to those described elsewhere in the present disclosure with respect to a UE 105.

In embodiments where the electronic device circuitry 200 is a UE 105 or is incorporated into or otherwise part of a UE 105, the antenna array may include at least a first receive antenna and a second receive antenna. For example, the one or more antennas may be an antenna array that includes a first receive antenna, a second receive antenna, a third receive antenna, and a fourth receive antenna. The receive circuitry 215 may be configured to receive a first set of one or more independent data streams in a downlink channel of a first cell, for example, cell 115-1. The receive circuitry 215 may be further configured to receive a second set of one or more independent data streams in a downlink channel of a second cell, such as cell 115-2. The receive circuitry 215 may be further configured to receive, from the first cell and/or the second cell, control information that includes an indication of a parameter of the first or second set of one or more independent data streams. The indication may indicate a QCL assumption to be used for determining channel characteristics for reception of the independent data streams. Furthermore, the control circuitry 205 may be configured to perform the processes described herein, such as processes 400-600 described with respect to FIGS. 4-6.

In embodiments where the electronic device circuitry 200 is a transmission point and/or downlink cell, or is incorporated into or otherwise part of a transmission point and/or downlink cell (for example, eNB 110-1 associated with cell 115-1) the control circuitry 205 may be configured to identify control information related to a parameter of a first independent data stream that is to be transmitted by the downlink cell or a second independent data stream that is to be transmitted by another downlink cell (for example, eNB 110-2 associated with cell 115-2). In such embodiments, the transmit circuitry 210 may be configured to transmit the first independent data stream and the control information to a UE 105. The parameter may indicate a QCL assumption to be used to determine channel characteristics for reception of the first independent data stream and/or the second independent data stream. The indication may indicate a QCL assumption to be used for determining channel characteristics for reception of the independent data streams. Furthermore, the control circuitry 205 may be configured to perform the processes described herein, such as processes 700-800 described with respect to FIGS. 7-8.

Figure 3:
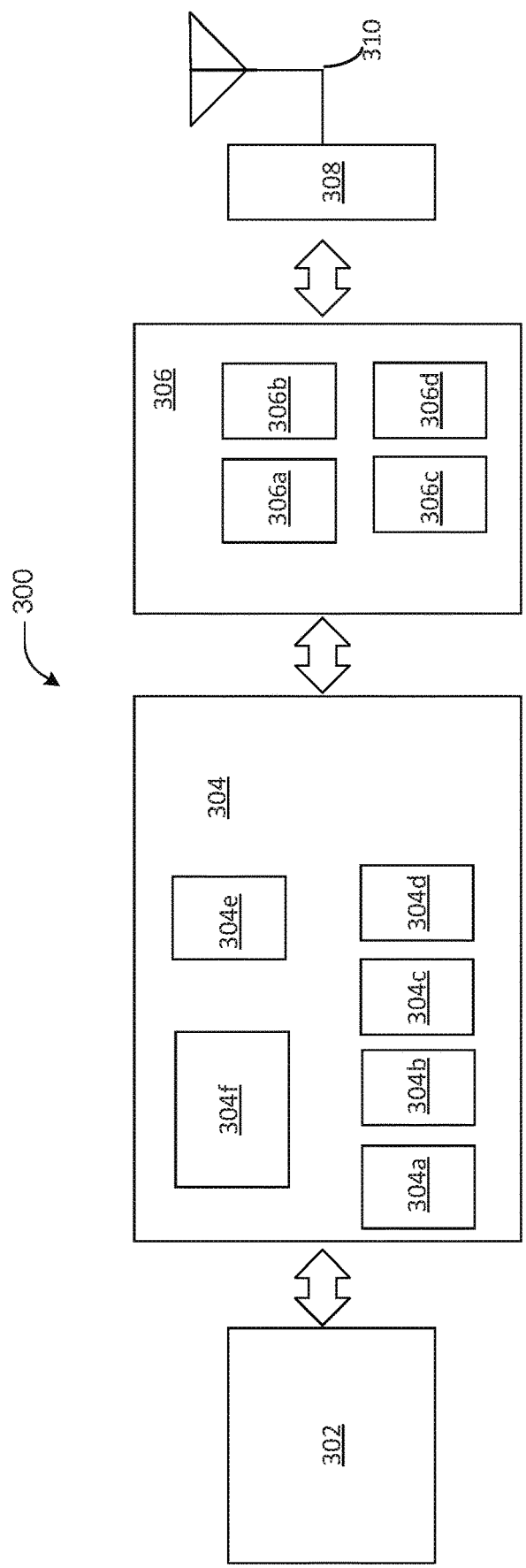
FIG. 3 illustrates example components of a UE device, in accordance with various example embodiments.

FIG. 3 illustrates, for one embodiment, example components of an electronic device 300. In various embodiments, the electronic device 300 may be the same or similar to UE 105 as described previously with regard to FIGS. 1-2. In some embodiments, the electronic device 300 may include application circuitry 302, baseband circuitry 304, radio frequency (RF) circuitry 306, front-end module (FEM) circuitry 308 and one or more antennas 310, coupled together at least as shown.

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuity 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (e.g., fifth generation (5G), 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f. The audio DSP(s) 304f may include elements for compression/decompression and echo cancellation and may include other suitable processing elements in other embodiments. Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a system on a chip (SOC).

In some embodiments, the baseband circuitry 304 may provide for communication compatible with one or more radio technologies. For example, in some embodiments, the baseband circuitry 304 may support communication with an E-UTRAN and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc., to facilitate the communication with the wireless network. RF circuitry 306 may include a receive signal path that may include circuitry to down-convert RF signals received from the FEM circuitry 308 and provide baseband signals to the baseband circuitry 304. RF circuitry 306 may also include a transmit signal path that may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect, as other types of frequency synthesizers may be suitable. For example, synthesizer circuitry 306d may be a delta-sigma synthesizer, a frequency multiplier, or a synthesizer comprising a phase-locked loop with a frequency divider. The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 depending on the desired output frequency. In some embodiments, a divider control input (e.g., N) may be determined from a look-up table based on a channel indicated by the application circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path that may include circuitry configured to operate on RF signals received from one or more antennas 310, amplify the received signals and provide the amplified versions of the received signals to the RF circuitry 306 for further processing. FEM circuitry 308 may also include a transmit signal path that may include circuitry configured to amplify signals for transmission provided by the RF circuitry 306 for transmission by one or more of the one or more antennas 310. In some embodiments, the FEM circuitry 308 may include a TX/RX switch to switch between transmit mode and receive mode operation. The FEM circuitry 308 may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the electronic device 300 may include additional elements such as, for example, memory/storage, display, camera, sensor, and/or input/output (I/O) interface (not shown).

In some embodiments, the RF circuitry 306 may be a receiver, or otherwise included in a receiver, such as an MMSE-IRC receiver, an R-ML receiver, an SLIC or CWIC receiver, and/or any other suitable receiver.

In embodiments where the electronic device 300 is a UE 105 or is incorporated into or otherwise part of a UE 105, the one or more antennas 310 may include at least a first receive antenna and a second receive antenna. For example, the one or more antennas 310 may be an antenna array that includes a first receive antenna, a second receive antenna, a third receive antenna, and a fourth receive antenna. The RF circuitry 306 may be configured to receive a first set of one or more independent data streams in a downlink channel of a first downlink cell, for example, cell 115-1. The RF circuitry 306 may be further configured to receive a second set of one or more independent data streams in a downlink channel of a second downlink cell, such as cell 115-2. The RF circuitry 306 may be further configured to receive, from the first and/or second downlink cells, control information that includes an indication of a parameter of the first or second set of one or more independent data streams. The indication (or parameter) may indicate a QCL assumption to be used for determining channel characteristics for reception of the independent data streams. Furthermore, the baseband circuitry 304 may be configured to perform the processes described herein, such as processes 400-600 described with respect to FIGS. 4-6.

In embodiments where the electronic device 300 is a transmission point and/or downlink cell, or is incorporated into or otherwise part of a transmission point and/or downlink cell (for example, eNB 110-1 associated with cell 115-1), the baseband circuitry 304 may be configured to identify control information related to a parameter of a first independent data stream that is to be transmitted by the downlink cell or a second independent data stream that is to be transmitted by another downlink cell (for example, eNB 110-2 associated with cell 115-2). In such embodiments, the RF circuitry 306 may be configured to transmit the first independent data stream and the control information to a UE 105. The indication (or parameter) may indicate a QCL assumption to be used for determining channel characteristics for reception of the independent data streams. Furthermore, the baseband circuitry 304 may be configured to perform the processes described herein, such as processes 700-800 described with respect to FIGS. 7-8.

Figure 4:
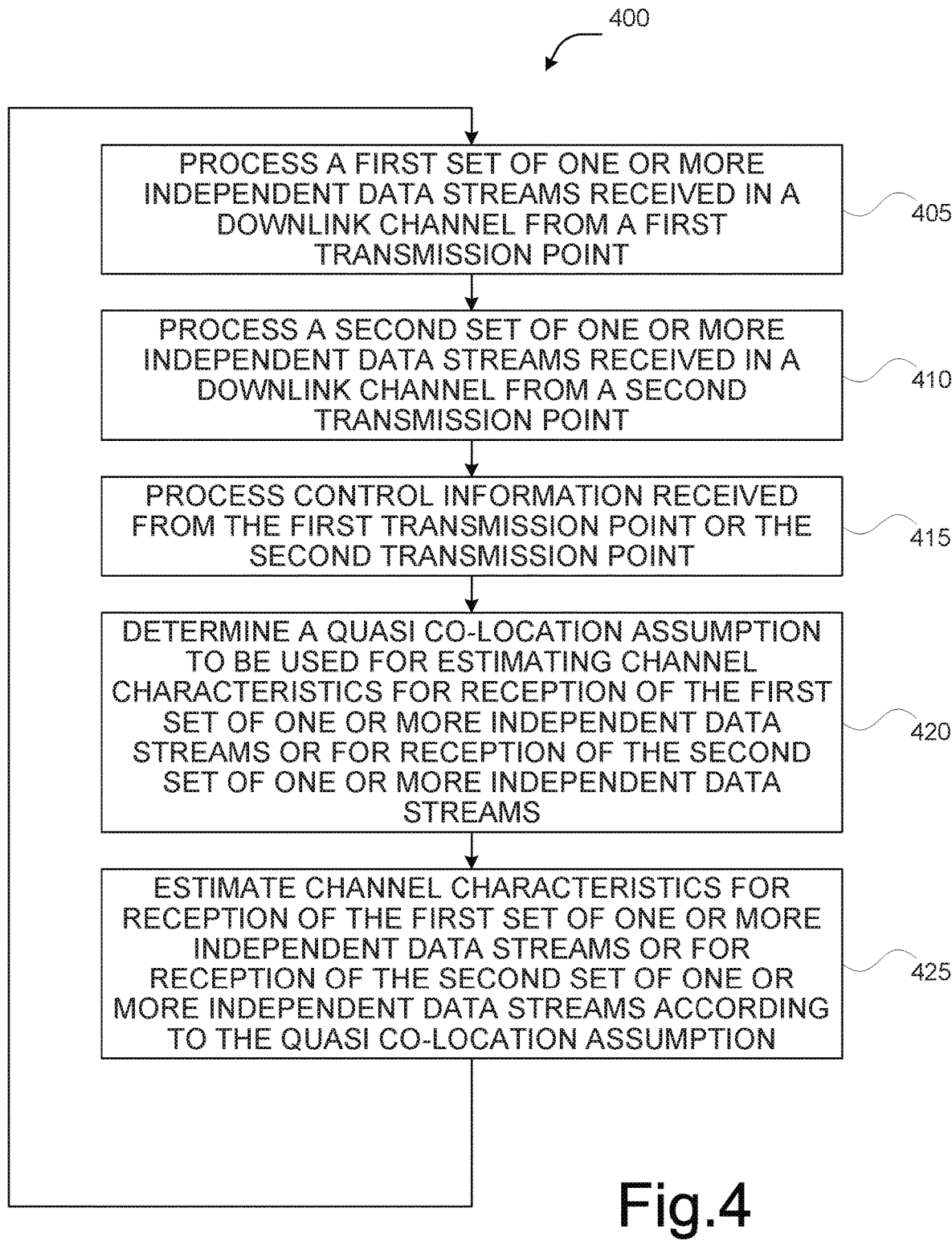
FIG. 4 illustrates a process that may be performed by a UE to determine quasi co-location (QCL) assumptions for multi-cell, multi-point single user (SU) multiple input and multiple output (MIMO) transmissions, in accordance with various embodiments.

FIG. 4 illustrates a process 400 that may be performed by a UE 105 to determine QCL assumptions for multi-cell, multi-point SU-MIMO transmissions, in accordance with various embodiments. In some embodiments, the UE 105 may include one or more non-transitory computer-readable media having instructions, stored thereon, which when executed by the UE 105, cause the UE 105 to perform the process 400. For illustrative purposes, the operations of process 400 will be described as being performed by the UE 105, which is described with respect to FIGS. 1-3. However, it should be noted that other similar devices may operate the process 400. While particular examples and orders of operations are illustrated in FIG. 4, in various embodiments, these operations may be re-ordered, broken into additional operations, combined, and/or omitted altogether. In some embodiments, the operations illustrated in FIG. 4 may be combined with operations described with regard to other embodiments, such as those illustrated by one or more of FIGS. 5-8 and/or one or more operations described with regard to the non-limiting examples provided herein.

Referring to FIG. 4, at operation 405 the UE 105 may process a first set of one or more independent data streams received in a downlink channel from a first transmission point. At operation 410, the UE 105 may process a second set of one or more independent data streams received in a downlink channel from a second transmission point. Each independent data stream may correspond with a transmission layer (also referred to as a "layer" herein). In some embodiments, at least one independent data stream may be transmitted by at least one antenna port of a plurality of antenna ports associated with one or more reference signals, such as UE-specific RSs of the first transmission point or the second transmission point.

At operation 415, the UE 105 may process control information received from either the first transmission point or the second transmission point. At operation 420, the UE 105 may determine a QCL assumption to be used for estimating channel characteristics for reception of the first set of one or more independent data streams or for reception of the second set of one or more independent data streams. The control information may include an indication of a QCL assumption to be used for estimating channel characteristics for reception of the first set of one or more independent data streams or for reception of the second set of one or more independent data streams. According to various embodiments, the UE 105 may not assume that the plurality of antenna ports are quasi co-located with respect to at least one of a Doppler shift, a Doppler spread, an average delay, or delay spread. In some embodiments, the indication may indicate that no QCL assumption is to be used, while in other embodiments, the indication may indicate an appropriate QCL assumption to be used. At operation 425, the UE 105 may estimate channel characteristics for reception of the first set of one or more independent data streams or for reception of the second set of one or more independent data streams according to the quasi co-location assumption.

When the indication indicates that no QCL assumption is to be used, and the UE 105 may assume the same channel characteristics (for example, a same Doppler shift, Doppler spread, average delay, and delay spread) over a predefined set of physical resource blocks (PRBs). In such embodiments, the UE 105 may perform channel estimation for downlink channels from each transmission point separately over the predefined set of PRBs. The predefined set of PRBs may be a PRB bundling set. A PRB bundling set may include two or more PRB bundles. Each PRB bundle may include a number of contiguous or consecutive PRBs that are scheduled for the UE 105. The UE 105 may assume that the consecutive PRBs in a PRB bundle use the same precoder for a corresponding PDSCH transmission from a serving eNB 110. Each PRB bundle may have a number of associated UE-specific RSs (for example, each PRB bundle may be associated with 12 UE-specific RSs). In such embodiments, the UE 105 may perform a time frequency tracking operation using a UE-specific RS transmitted individually on each antenna port. The time frequency operation may be used to determine a time frequency offset for each UE-specific RS antenna port of each transmission point. In some embodiments, the time frequency offset for each UE-specific RS antenna port and/or transmission point may be computed by joint processing of the PRBs bundled in a PRB bundling set. Using the time frequency offset, the UE 105 may determine UE-specific RSs for a set of PRBs transmitted from a transmission point.

When the indication is to indicate an appropriate QCL assumption to be used, the indication may indicate that individual transmitted UE-specific RS antenna ports (for example, antenna ports 7-14) are quasi co-located with one or more antenna ports associated with one or more other RSs. The other RSs may include one or more CRS (for example, antenna ports 0-3), one or more CSI-RS antenna ports (for example, antenna ports 15-22), and/or one or more discovery RS antenna ports (which may be used for discovering signals broadcast by a smallcell base station). In such embodiments, the eNB 110 may configure the UE 105 with an appropriate QCL assumption. For example, the eNB 110 may provide configuration information through RRC signaling or through physical layer signaling. For instance, the QCL assumptions may be indicated to a UE 105 using a "PDSCH resource element (RE) Mapping and Quasi-Co-Location" indicator field included in a DCI format 2D message or a new DCI format message (for example, a DCI format 2E message). Furthermore, in some embodiments, two or more "PDSCH RE Mapping and Quasi-Co-Location Indicator" fields may be used in a DCI format 2D message to indicate two or more QCL assumptions between subsets of scheduled UE-specific RS antenna ports with CSI-RS antenna ports and/or CRS antenna ports. In other embodiments, two or more DCI messages may be sent to the UE 105, where each DCI message may indicate one or more parameters associated with the transmission from a corresponding transmission point. In such embodiments, the one or more parameters may include a QCL assumption between one or more UE-specific RS antenna ports and a higher layer configured CRS resource and/or a CSI-RS resource associated with a transmission point.

By way of example, at operation 415 the UE 105 may receive one or more DCI Format 2D messages, each of which may include a "PDSCH RE mapping and Quasi Co-Location Indicator" field. At operation 420, the UE 105 may determine a resource element mapping using the information contained in the two or more "PDSCH RE Mapping and Quasi-Co-Location Indicator" fields. For example, when the UE 105 is configured in transmission mode 10 for a given serving cell 115, the UE 105 may be configured with up to four (4) parameter sets by higher layer signaling to decode PDSCH transmission(s) according to a detected PDCCH/enhanced physical downlink control channel (EPDCCH) transmission(s) with DCI format 2D intended for the UE 105 and the given serving cell 115. The UE 105 may use the parameter set according to the value of the "PDSCH RE Mapping and Quasi-Co-Location Indicator" field in the detected DCI format 2D message for determining a PDSCH RE mapping. The values of the "PDSCH RE Mapping and Quasi-Co-Location Indicator" field may be as follows.

TABLE 1

| PDSCH RE Mapping and Quasi-Co-Location Indicator field in DCI format 2D | |
|---|---|
| Value of "PDSCH RE Mapping and Quasi-Co-Location Indicator" field | Description |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The parameters for determining PDSCH RE mapping and PDSCH antenna port quasi co-location are configured via higher layer signaling for each parameter set include "crs-PortsCount-r11," "crs-FreqShift-r11," "mbsfn-SubframeConfigList-r11," "csi-RS-ConfigZPId-r11," "pdsch-Start-r11," and "qcl-CSI-RS-ConfigNZPId-r11."

In addition to determining a PDSCH RE mapping using the parameter set according to the value of the "PDSCH RE Mapping and Quasi-Co-Location Indicator" field, the UE 105 may use the value contained in the "PDSCH RE mapping and Quasi Co-Location Indicator" fields to determine the one or more other RSs that are quasi co-located with one or more UE-specific RSs. For instance, the UE 105 may use the indicated parameter set for determining PDSCH antenna port quasi co-location if the UE 105 is configured as a "Type B" quasi co-location type. For instance, according to current standards, a UE configured in transmission mode 10 for a serving cell is configured with one of two quasi co-location types (for example, type A and type B) for the serving cell by higher layer parameter "qcl-Operation" to decode PDSCH transmissions according to transmission scheme associated with antenna ports 7-14. When the UE 105 is configured as a type A UE, the UE 105 may assume the antenna ports 0-3 and/or 7-22 of a serving cell are quasi co-located with respect to delay spread, Doppler spread, Doppler shift, and average delay. When the UE 105 is configured as a type B UE, the UE 105 may assume the antenna ports 15-22 corresponding to the CSI-RS resource configuration identified by the higher layer parameter "qcl-CSI-RS-ConfigNZPId-r11" and the antenna ports 7-14 associated with the PDSCH are quasi co-located with respect to Doppler shift, Doppler spread, average delay, and delay spread.

According to various embodiments, the value of the "PDSCH RE Mapping and Quasi-Co-Location Indicator" field may also be used to indicate the PDSCH RE mapping pattern for a transmitting cell. For example, the resource elements used by CRS antenna ports may depend upon a physical cell ID or a multicast/broadcast over a single frequency network (MBSFN) subframe configuration. In these cases, the PDSCH RE mapping may be determined by the number of CRS antenna ports, a CRS shift in frequency, and/or a MBSFN subframe configuration. The PDSCH REs may also depend on the number of orthogonal frequency-division multiplexing (OFDM) symbols used for control channel transmission. Furthermore, CSI-RS transmissions may also be different for different cells and/or transmission points, and therefore, CSI-RS resource configuration may also be used for determination of the PDSCH REs. As part of PDSCH RE mapping, a set of quasi co-located CRS and CSI-RS antenna ports may be provided to indicate one or more reference signals that may be used for estimation of time-frequency offsets corresponding to a transmission point. The estimated offsets may be compensated on the received PDSCH and UE-specific RS using a suitable timing and frequency offset compensation function.

Figure 5:
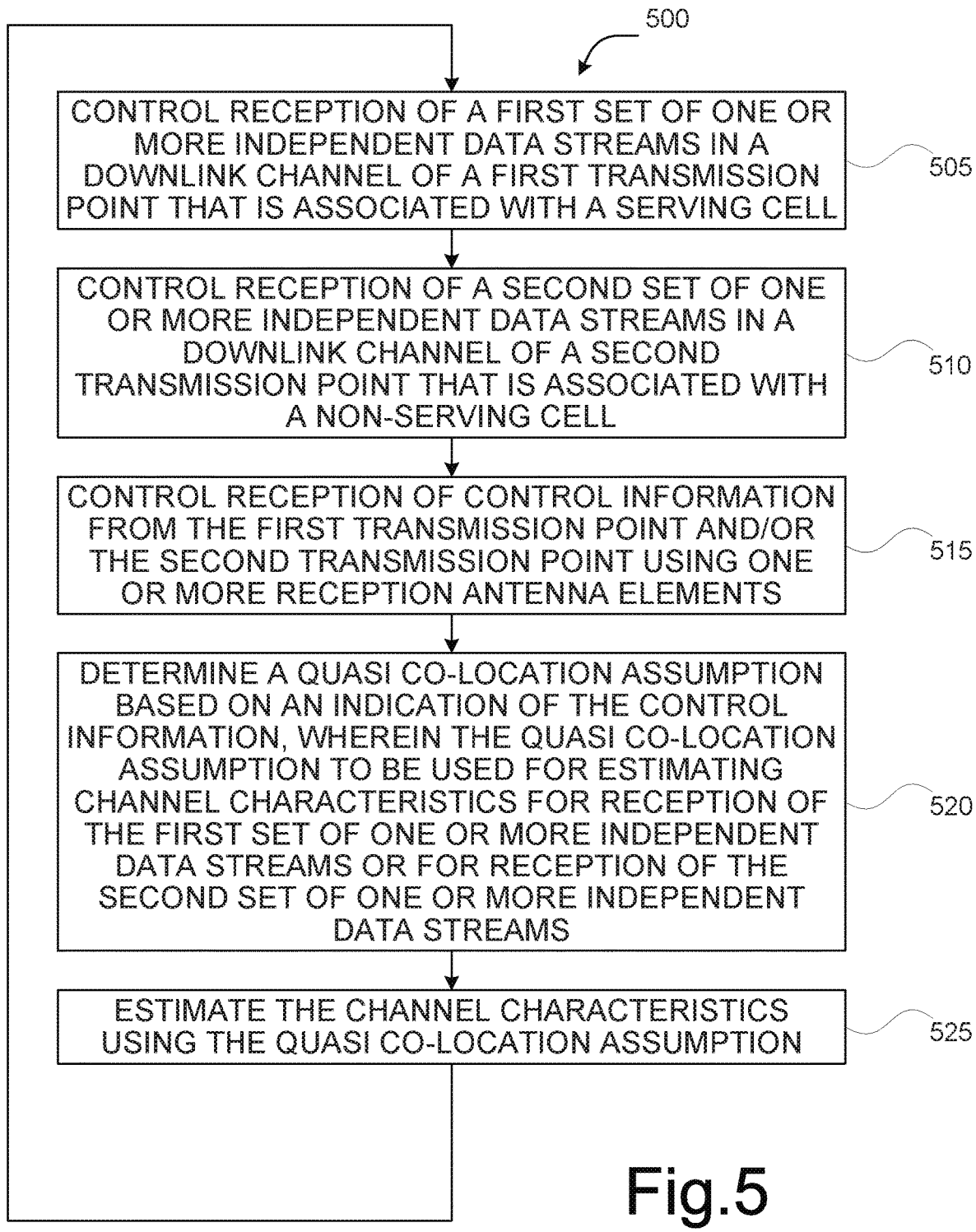
FIG. 5 illustrates another process that may be performed by a UE to determine QCL assumptions for multi-cell, multi-point SU-MIMO transmissions, in accordance with various embodiments.

FIG. 5 illustrates a process 500 that may be performed by a UE 105 to determine QCL assumptions for multi-cell, multi-point SU-MIMO transmissions, in accordance with various embodiments. In some embodiments, the UE 105 may include one or more non-transitory computer-readable media having instructions, stored thereon, that when executed by the UE 105, cause the UE 105 to perform the process 500. For illustrative purposes, the operations of process 500 will be described as being performed by the UE 105, which is described with respect to FIGS. 1-3. However, it should be noted that other similar devices may operate the process 500. While particular examples and orders of operations are illustrated in FIG. 5, in various embodiments, these operations may be re-ordered, broken into additional operations, combined, and/or omitted altogether. In some embodiments, the operations illustrated in FIG. 5 may be combined with operations described with regard to other embodiments, such as those illustrated by one or more of FIGS. 4 and 6-8 and/or one or more operations described with regard to the non-limiting examples provided herein.

Referring to FIG. 5, at operation 505 the UE 105 may control reception of a first set of one or more independent data streams in a downlink channel of a first transmission point that is associated with a serving cell 115. At operation 510, the UE 105 may control reception of a second set of one or more independent data streams in a downlink channel of a second transmission point that is associated with a non-serving cell 115. At least one individual data stream of the first set of one or more independent data streams may correspond to an individual layer, and the independent data stream may be transmitted by at least one UE-specific RS antenna port (for example, one or more of antenna ports 7-14) of the first transmission point.

At operation 515, the UE 105 may control reception of control information from the first transmission point and/or the second transmission point using one or more reception antenna elements. At operation 520, the UE 105 may determine a QCL assumption to be used for estimating channel characteristics for reception of the first set of one or more independent data streams or for reception of the second set of one or more independent data streams. In various embodiments, the control information may include an indication of a parameter of the first or second set of one or more independent data streams. The parameter may be indicative of a QCL assumption to be used for estimating channel characteristics of the downlink channels providing the first or second set of one or more independent data streams. At operation 525, the UE 105 may estimate, using the quasi co-location assumption, channel characteristics for reception of the first set of one or more independent data streams or for reception of the second set of one or more independent data streams. The channel characteristics may include Doppler shift, Doppler spread, average delay, and/or delay spread. In some embodiments, the parameter may indicate that no QCL assumption is to be used and that the UE 105 may assume the same channel characteristics across a defined set of PRBs (as discussed with regard to FIG. 4).

According to various embodiments, the indication (or parameter) may indicate an appropriate QCL assumption to be used. For example, the indication (or parameter) may indicate that one or more UE-specific RS antenna ports may be quasi co-located with antenna ports associated with one or more other reference signal(s). The other reference signals may include one or more CRS antenna ports (for example, antenna ports 0-3), one or more CSI-RS antenna ports (for example, antenna ports 15-22), and/or one or more discovery RSs.

In some embodiments, two or more PDSCH REs mapping sets may be provided to the UE 105 so that the UE 105 may determine PDSCH REs mapping assumptions for each MIMO layer transmitted by the corresponding transmission point. For instance, the position of PDSCH REs within a subframe may depend on the REs occupied by one or more CRSs, which may be based on a cell ID of a transmission point or cell 115. In some cases, if the transmission of PDSCH on MIMO layers is performed from multiple transmission points, where each transmission point has a different cell ID, the PDSCH REs positions may not be aligned across each of the multiple transmission points. Therefore, in some embodiments, two or more PDSCH REs mapping sets may be signaled to the UE 105 to determine the PDSCH REs mapping assumptions associated with each MIMO layer(s) transmitted by the transmission point. In some embodiments, the two or more PDSCH REs mapping sets may be used to determine the PDSCH REs assumptions for MIMO layers associated with UE-specific RS antenna ports. In such embodiments, the two or more PDSCH REs mapping sets may be provided to the UE 105 using two or more "PDSCH RE Mapping and Quasi-Co-Location Indicator" fields in two or more DCI messages. In such embodiments, each "PDSCH RE Mapping and Quasi-Co-Location Indicator" field may provide an association of scheduled MIMO layers (UE-specific RS antenna ports) with a PDSCH RE mapping. In other embodiments, two or more DCI Format 2D messages may be sent to the UE 105 to indicate transmission parameters for scheduled layers including their UE specific RS antenna ports and their PDSCH REs mapping.

Figure 6:
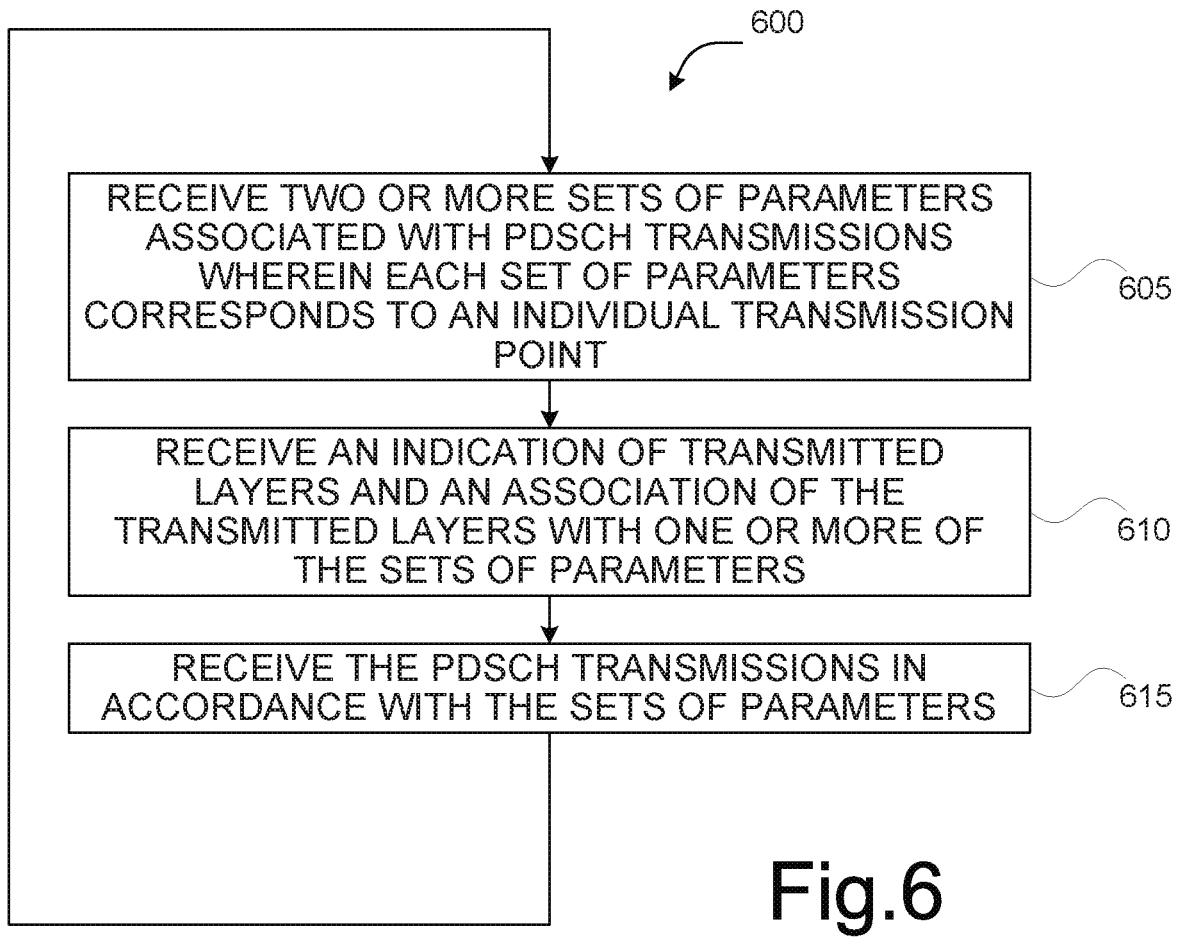
FIG. 6 illustrates another process that may be performed by a UE to determine QCL assumptions for multi-cell, multi-point SU-MIMO transmissions, in accordance with various embodiments.

FIG. 6 illustrates a process 600 that may be performed by a UE 105 to determine QCL assumptions for multi-cell, multi-point SU-MIMO transmissions, in accordance with various embodiments. In some embodiments, the UE 105 may include one or more non-transitory computer-readable media having instructions, stored thereon, that when executed by the UE 105, cause the UE 105 to perform the process 600. For illustrative purposes, the operations of process 600 will be described as being performed by the UE 105, which is described with respect to FIGS. 1-3. However, it should be noted that other similar devices may operate the process 600. While particular examples and orders of operations are illustrated in FIG. 6, in various embodiments, these operations may be re-ordered, broken into additional operations, combined, and/or omitted altogether. In some embodiments, the operations illustrated in FIG. 6 may be combined with operations described with regard to other embodiments, such as those illustrated by one or more of FIGS. 4-5 and 7-8 and/or one or more operations described with regard to the non-limiting examples provided herein.

Referring to FIG. 6, at operation 605 the UE 105 may receive two or more sets of parameters associated with PDSCH transmissions, wherein each set of parameters corresponds to an individual transmission point. At operation 610, the UE 105 may receive an indication of one or more transmitted layers and an association of the transmission layers with one or more of the sets of parameters. At operation 615, the UE 105 may receive the PDSCH transmissions in accordance with the sets of parameters.

A PDSCH parameter set may be used to derive PDSCH REs, which are used by a transmission point to transmit PDSCH transmissions. In some embodiments, a PDSCH parameter set may contain the CRS parameters, such as a CRS shift, cell identity, a number of CRS antenna ports, and the like. In some embodiments, a PDSCH parameter set may contain parameters of non-zero power channel state information reference signals (NZP CSI-RSs), such as number of NZP CSI-RS antenna ports, a scrambling identity, a pattern index, and/or the like. In some embodiments, a PDSCH parameter set may be used to establish a QCL assumption of CRS antenna ports and/or NZP CSI-RS antenna ports with UE-specific RS antenna ports. In such embodiments, the QCL assumption may be used to derive channel characteristics, such as delay spread, Doppler spread, time offset, frequency offset, and/or average channel gain.

Each set of parameters may be signaled to the UE 105 using higher layer signaling, such as using RRC signaling. Additionally, each PDSCH parameter set may be provided to the UE 105 on a per-transport block basis. In some embodiments, transport blocks may be transmitted from different transmission points, and in some cases, from the same transmission point. Since different transmission points may have different PDSCH REs, a parameter may be included in the "PDSCH RE Mapping and Quasi-Co-Location Indicator" field of one or more DCI messages for each transport block. The "PDSCH RE Mapping and Quasi-Co-Location Indicator" field may include 2 bits in a DCI format 2D message as discussed above with regard to FIG. 4. In other embodiments, a new DCI format (for example, a DCI Format 2E) message may be used to indicate a QCL assumption. The new DCI format may also include a "PDSCH RE Mapping and Quasi-Co-Location Indicator" field to indicate the QCL assumptions, or the new DCI format may include another suitable field for indicating the QCL assumption(s).

The per-transport block indication may allow for QCL associations of UE-specific RS antenna ports with different CSI-RSs and/or CRSs transmitted by different transmission points. Such QCL associations may be used for time frequency offset measurements and compensation according to a suitable time frequency offset estimation function. The example of the association between layers and 1st and 2nd "PDSCH RE Mapping and Quasi-Co-Location Indicator" fields is shown below for total number of layers 2-8.

TABLE 2

Association between layers and 1st and 2nd antenna ports

| Total Number of Layers | 1st {PDSCH REs, QCL-ed CRS, CSI-RS} for the layers transmitted on antenna ports (Transport block 1) | 2nd {PDSCH REs, QCL-ed CRS, CSI-RS} for the layers transmitted on antenna ports (Transport block 2 |
|---|---|---|
| 2 | 7 | 8 |
| 3 | 7-8 | 9 |
| 4 | 7-8 | 9-10 |
| 5 | 7-9 | 10-11 |
| 6 | 7-9 | 10-12 |
| 7 | 7-10 | 11-13 |
| 8 | 7-10 | 11-14 |

Table 2 shows the quasi co-location of CRS antenna ports and/or CSI-RS antenna ports for layers to be transmitted on the specified antenna ports. For example, if a PDSCH transmission with a total of 8 layers is scheduled for transmission, then a set of first layers transmitted on antenna ports 7-10 may be quasi co-located with first CRS antenna ports and/or CSI-RS antenna ports, and a set of second layers transmitted on antenna ports 11-14 may be quasi co-located with second CRS antenna ports and/or CSI-RS antenna ports. To simplify processing of the received PDSCH transmissions, in some embodiments, some parameters associated with "PDSCH RE Mapping and Quasi Co-Location Indicator" fields may be the same across two or more transport blocks. For example, in such embodiments, the UE 105 may assume a same PDSCH starting symbol for two transport blocks, which may be set in accordance to the first (or second) "PDSCH RE Mapping and Quasi-Co-Location Indicator" field.

In other embodiments, "PDSCH RE Mapping and Quasi Co-Location Indicator" fields may provide information about PDSCH RE mapping on different layers, and the QCL information for the layers associated with UE-specific RS antenna ports may not be provided. In this case, UE-specific RS antenna ports used to transmit layers of different transport blocks may not be assumed to be quasi co-located. Instead, the UE 105 may assume that UE-specific RS antenna ports used to transmit layers of one transport block are quasi co-located. The time-frequency tracking in this case should be performed by the UE 105 independently on different groups of UE-specific RS. For example, in accordance with table 2, if PDSCH transmission with 4 layers is scheduled, the UE 105 may assume QCL of antenna ports 7 and 8 or QCL of antenna ports 9 and 10, but not between antenna ports 7-8 and 9-10. Such embodiments are based on an assumption that UE-specific RS antenna ports are not quasi co-located with one another. This assumption may correspond to new QCL behavior that may be configured to the UE 105 via higher layer signaling, such as RRC signaling. In such embodiments, the UE 105 may assume that there are no QCL assumptions only when the size of resource allocation is above N resource blocks, wherein N=2 or N=3. In other embodiments, the UE 105 may assume QCL between UE-specific and other reference signals such as CRS and/or CSI-RS, e.g., corresponding to the serving cell.

Figure 7:
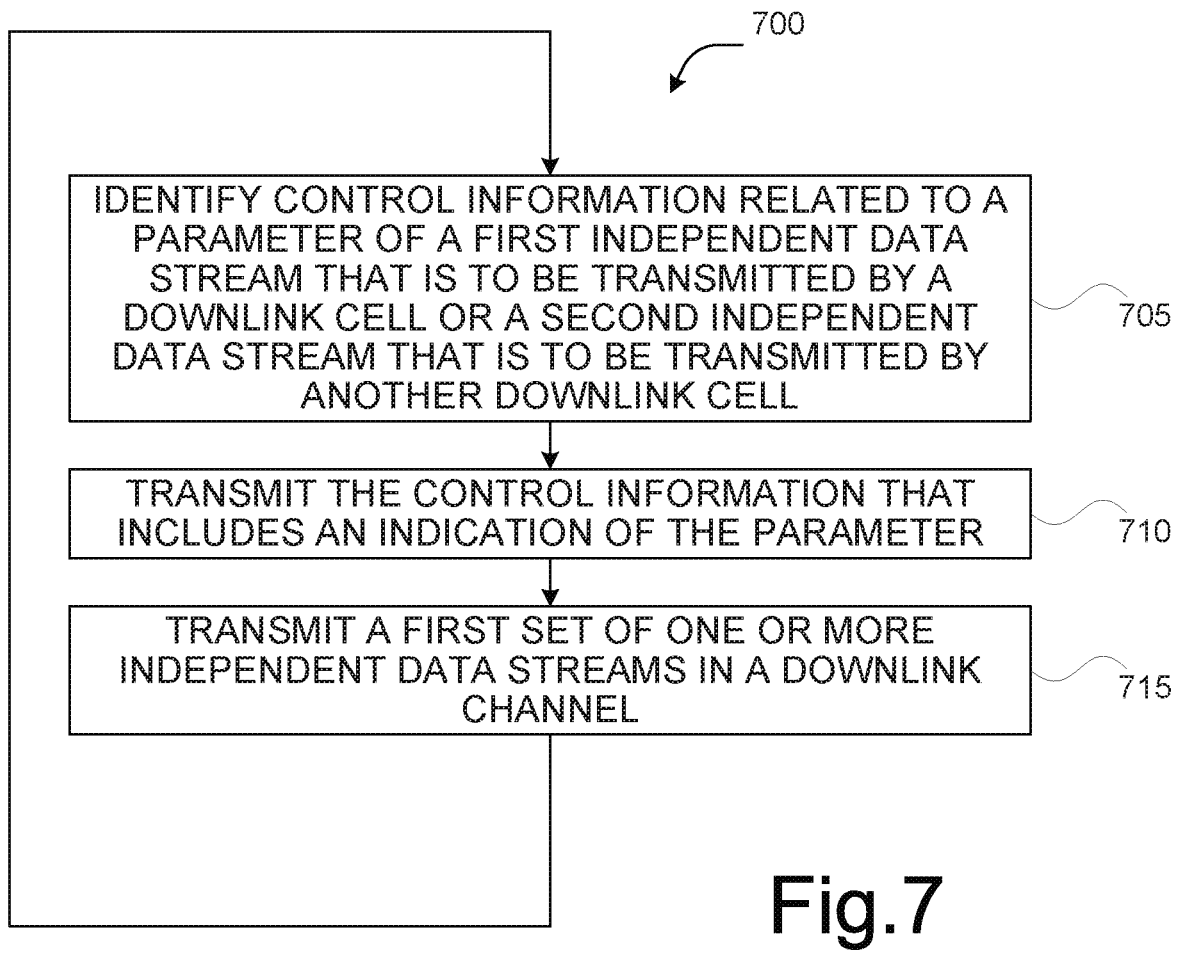
FIG. 7 illustrates a process that may be performed by an eNB to facilitate multi-cell, multi-point SU-MIMO transmissions, in accordance with various embodiments.

FIG. 7 illustrates a process 700 that may be performed by an eNB 110 to determine and provide QCL assumptions for multi-cell, multi-point SU-MIMO transmissions, in accordance with various embodiments. In some embodiments, the eNB 110 may include one or more non-transitory computer-readable media having instructions, stored thereon, that when executed by the eNB 110, cause the eNB 110 to perform the process 700. For illustrative purposes, the operations of process 700 will be described as being performed by the eNB 110, which is described with respect to FIGS. 1-3. However, it should be noted that other similar devices and/or network elements may operate the process 700. While particular examples and orders of operations are illustrated in FIG. 7, in various embodiments, these operations may be re-ordered, broken into additional operations, combined, and/or omitted altogether. In some embodiments, the operations illustrated in FIG. 7 may be combined with operations described with regard to other embodiments, such as those illustrated by FIGS. 4-6 and 8 and/or one or more operations described with regard to the non-limiting examples provided herein.

Referring to FIG. 7, at operation 705 the eNB 110 may identify control information related to a parameter of a first independent data stream that is to be transmitted by a downlink cell associated with the eNB 110 or a second independent data stream that is to be transmitted by another downlink cell that is associated with another eNB 110. At operation 710, the eNB 110 may transmit the control information that includes an indication of the parameter to a UE 105 so that the UE 105 may determine parameters of downlink transmissions. In various embodiments, the parameter may be indicative of a QCL assumption to be used for determining channel characteristics for obtaining the first independent data stream or the second independent data stream. For example, in some embodiments, CSI-RS antenna ports may not be assumed to be quasi co-located with one another, and the eNB 110 may use channel state information (CSI) to assist the transmission of the first set of one or more independent data streams. In such embodiments, the control information may configure a UE 105 with one of two CSI processes, a transmission point-specific CSI feedback process or an aggregated CSI feedback process.

In the transmission point-specific CSI feedback process, the CSI feedback for multi-point, multi-cell SU-MIMO operation may include configuring the UE 105 with two or more CSI reporting processes, where each CSI reporting process contains one NZP CSI-RS resource for channel measurement associated with one transmission point. Each CSI process may represent CSI for one link 120 between the UE 105 and a transmission point. In such embodiments, for each link 120, the UE 105 may provide CSI feedback (for example, channel quality indicator (CQI), precoding matrix indicator (PMI), rank indicator (RI), and/or the like) to a corresponding transmission point. In some embodiments, CQI reporting may be provided for aggregated CSI-RS resource, which is combined from a set of CSI-RS resources configured for the UE 105. The CSI-RS resource aggregation may be provided by signaling the CSI-RS resource indexes to the UE 105. Furthermore, each CSI feedback process may yield different RI values, and under current standards, a first CSI feedback process may inherit the RI values from a second CSI feedback process. In such embodiments, the RI values of the second CSI feedback may be assumed for first CSI feedback process, while the PMI and CQI would be determined independently among the CSI feedback processes. In various embodiments, an indication of the RI inheritance from a corresponding CSI feedback processes may be also provided to another CSI feedback process to calculate CQI based on the assumption that precoding using PMIs were calculated for the CSI feedback processes. The CQI with aggregated CSI-RS resources may be derived as an average CQI, where the averaging is performed across different phases between CSI-RS resources that comprise the aggregated CSI-RS resource.

In the aggregated CSI feedback process, one CSI reporting process is used, where the CSI process contains a CSI-RS resource with antenna ports transmitted from all antenna elements of the two or more transmission points. In this case the existing QCL assumption for CSI-RS resource should be relaxed and the UE shall not assume quasi co-location between antenna ports of one CSI-RS resource. In another embodiment, higher layer signaling may be used to indicate whether the QCL assumption for a given CSI-RS resource is valid or not. The eNB 110 may identify and transmit to the UE 105 an indication related to aggregation of CSI-RS antenna ports to be used for CSI reporting in higher layer signaling, for example, RRC signaling.

According to various embodiments, generating the control information may include a codeword to layer mapping to help control data rate assignments for each transmission layer. For instance, one or more transport blocks may be converted into a codeword, which may be used to obtain one or more modulation symbols. These modulation symbols may then be mapped to one or more antenna ports. In some embodiments, where two or more DCI messages are used to schedule PDSCH transmissions, the eNB 110 may map each codeword to an individual transmission layer, such that there is a one-to-one correspondence between each codeword and each layer. In other embodiments, the eNB 110 may map a plurality of layers to each codeword, which may reduce signaling overhead associated with indicating the modulation and coding scheme.

Referring back to FIG. 7, once the control information is identified and transmitted to the UE 105, at operation 715, the eNB 110 may transmit a first set of one or more independent data streams in a downlink channel.

Figure 8:
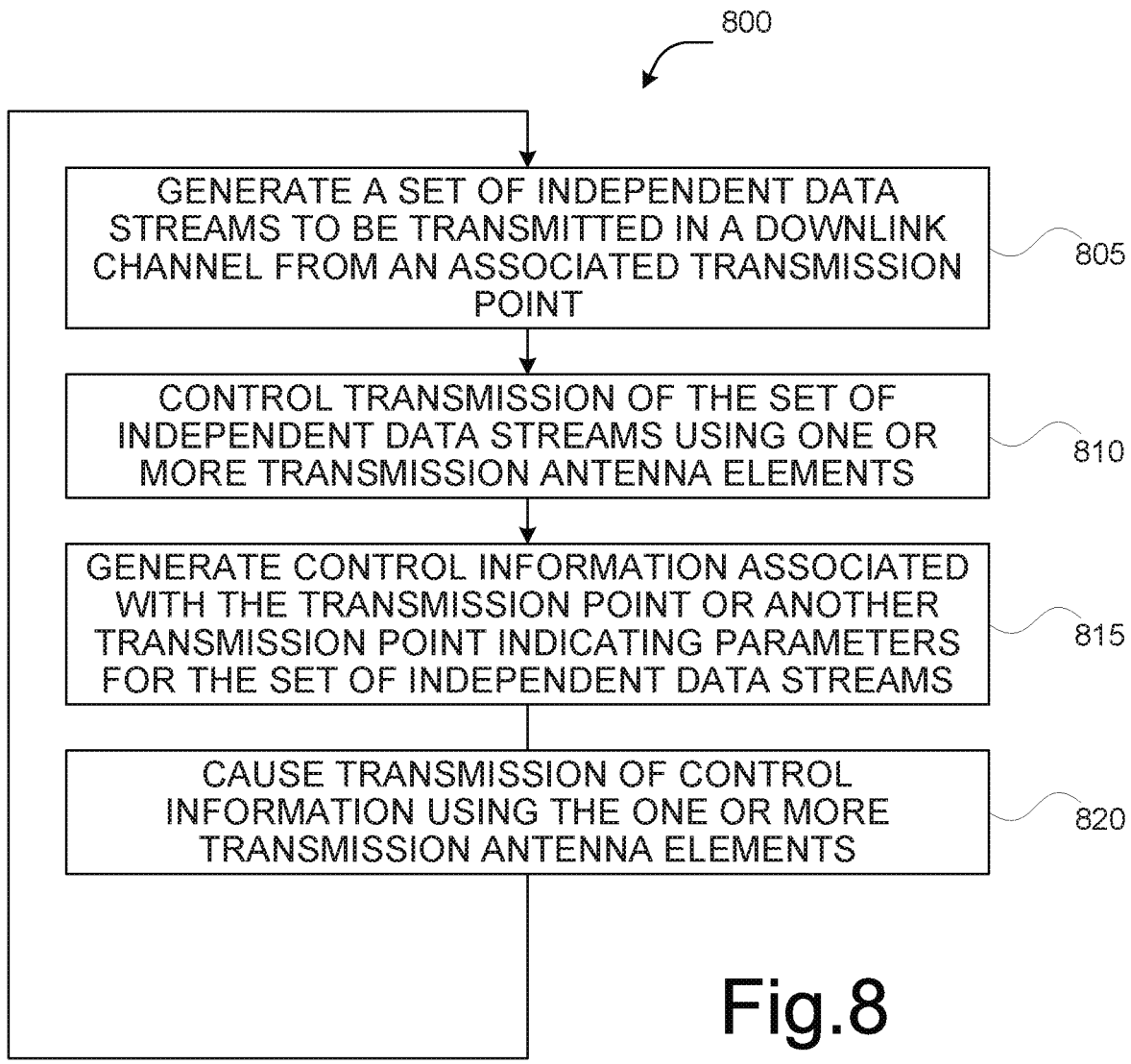
FIG. 8 illustrates another process that may be performed by an eNB to facilitate multi-cell, multi-point SU-MIMO transmissions, in accordance with various embodiments.

FIG. 8 illustrates a process 800 that may be performed by an eNB 110 to determine and provide QCL assumptions for multi-cell, multi-point SU-MIMO transmissions, in accordance with various embodiments. In some embodiments, the eNB 110 may include one or more non-transitory computer-readable media having instructions, stored thereon, which when executed by the eNB 110, cause the eNB 110 to perform the process 800. For illustrative purposes, the operations of process 800 will be described as being performed by the eNB 110, which is described with respect to FIGS. 1-3. However, it should be noted that other similar devices and/or network elements may operate the process 800. While particular examples and orders of operations are illustrated in FIG. 8, in various embodiments, these operations may be re-ordered, broken into additional operations, combined, and/or omitted altogether. In some embodiments, the operations illustrated in FIG. 8 may be combined with operations described with regard to other embodiments, such as those illustrated by one or more of FIGS. 4-7 and/or one or more operations described with regard to the non-limiting examples provided herein.

Referring to FIG. 8, at operation 805 the eNB 110 may generate a set of independent data streams to be transmitted in a downlink channel from an associated transmission point. In various embodiments, the transmission point associated with the eNB 110 may correspond with a downlink cell 115 or one or more physical transmission antenna elements. At operation 810, the eNB 110 may control transmission of the set of independent data streams to the UE 105 using the one or more transmission antenna elements. Each independent data stream may correspond to a single layer, and each independent data stream may be transmitted using at least one antenna port associated with one or more UE-specific RSs (for example, one or more of antenna ports 7-14). The eNB 110 may receive CSI feedback from the UE 105, which may be used by the eNB 110 to generate and transmit the independent data streams. In such embodiments, the eNB 110 may configure the UE 105 with one of two CSI processes, such as the transmission point-specific CSI feedback process or the aggregated CSI feedback process as discussed previously with regard to FIG. 7.

At operation 815, the eNB 110 may generate control information associated with the transmission point or another transmission point indicating parameters for the set of independent data streams. At operation 820, the eNB 110 may cause transmission of the control information using one or more transmission antenna elements. The parameters may be indicative of a quasi co-location assumption to be used for reception of the set of independent data streams. In various embodiments, transmitting the control information may include signaling the quasi co-location of the UE-specific RS antenna ports with one or more other reference signals using two or more "PDSCH RE Mapping and Quasi-Co-Location Indicator" fields according to the various example embodiments described previously. Furthermore, in some embodiments, the eNB 110 may generate the control information by mapping one codeword to one transmission layer when two or more DCI messages are to be used to schedule a PDSCH transmission. In other embodiments, the eNB 110 may map one codeword to two or more transmission layers associated with one or more independent data streams of the first set of one or more independent data streams or map one codeword to two or more layers associated with one or more independent data streams of the second set of one or more independent data streams. In either embodiment, the control information may indicate whether there is a one-to-one correspondence between each codeword and each transmission layer, or if there is a one-to-many correspondence between each codeword and two or more transmission layers.

The foregoing description of the above implementations provides illustration and description for the example embodiments, but is not intended to be exhaustive or to limit the scope of the invention to the precise form disclosed. Modifications and variations are possible in light of the above teachings and/or may be acquired from practice of various implementations of the invention. For example, the described example embodiments pertain to facilitating multi-cell, multi-point SU-MIMO transmissions. However, the example embodiments may be extended to be applicable for facilitating multi-cell, multi-point multiple user (MU)-MIMO transmissions, for example.

Some non-limiting examples are provided below.

Example 1 may include at least one computer-readable medium including instructions that, when executed by one or more processors, cause a user equipment (UE) to: process a first set of one or more independent data streams received in a downlink channel from a first transmission point; process a second set of one or more independent data streams received in a downlink channel from a second transmission point; process control information received from the first transmission point or the second transmission point; determine a quasi co-location assumption to be used for estimating channel characteristics for reception of the first set of one or more independent data streams or for reception of the second set of one or more independent data streams, wherein the quasi co-location assumption to be used is based on an indication within the control information; and estimate channel characteristics for reception of the first set of one or more independent data streams or for reception of the second set of one or more independent data streams according to the quasi co-location assumption. The at least one computer-readable medium may be a non-transitory computer-readable medium.

Example 2 may include the at least one computer-readable medium of example 1 and/or any other one or more examples disclosed herein, wherein at least one independent data stream of the first set of one or more independent data streams corresponds to a first layer, and the at least one independent data stream is to be transmitted by at least one antenna port of a plurality of antenna ports associated with one or more UE-specific reference signals (RSs) of the first transmission point.

Example 3 may include the at least one computer-readable medium of example 2 and/or any other one or more examples disclosed herein, wherein the indication is to indicate that the plurality of antenna ports are not assumed to be quasi co-located with respect to at least one of a Doppler shift, a Doppler spread, an average delay, or a delay spread.

Example 4 may include the at least one computer-readable medium of example 3 and/or any other one or more examples disclosed herein, wherein a same Doppler shift, Doppler spread, average delay, and delay spread are assumed over a predefined set of physical resource blocks (PRB s).

Example 5 may include the at least one computer-readable medium of example 3 and/or any other one or more examples disclosed herein, wherein the indication is to indicate that antenna ports of the plurality of antenna ports associated with the one or more UE-specific RSs are quasi co-located with one or more antenna ports associated with one or more other RSs.

Example 6 may include the at least one computer-readable medium of example 5 and/or any other one or more examples disclosed herein, wherein the one or more other RSs include one of cell specific RSs (CRSS), channel state information reference signals (CSI-RSs), or discovery RSs.

Example 7 may include the at least one computer-readable medium of example 2 and/or any other one or more examples disclosed herein, wherein the indication is to indicate quasi co-location of antenna ports of the plurality of antenna ports associated with the one or more UE-specific RSs with other RSs, and wherein the instructions, when executed by the one or more processors, cause the UE to: determine the one or more other RSs using two or more physical downlink shared channel (PDSCH) resource element (RE) mapping and Quasi Co-Location Indicator fields.

Example 8 may include the at least one computer-readable medium of example 2 and/or any other one or more examples disclosed herein, wherein the indication is to indicate quasi co-location of antenna ports of the plurality of antenna ports associated with the one or more UE-specific RSs with other RSs, and wherein the instructions, when executed by the one or more processors, cause the UE to: determine the one or more other RSs using two or more downlink control information (DCI) format 2D messages, wherein each of the two or more DCI format 2D messages include at least one PDSCH RE mapping and Quasi Co-Location Indicator field.

Example 9 may include the at least one computer-readable medium of example 2 and/or any other one or more examples disclosed herein, wherein the indication is to indicate an RE mapping for the one or more independent data streams of the first set of one or more independent data streams and the one or more independent data streams of the second set of one or more independent data streams, and wherein the instructions, when executed by the one or more processors, cause the UE to: determine the RE mapping using two or more PDSCH RE Mapping and Quasi-Co-Location Indicator fields.

Example 10 may include an apparatus to be implemented in a user equipment (UE) comprising: an antenna array that includes at least a first receive antenna and a second receive antenna; one or more computer-readable storage media having instructions; and one or more processors coupled with the antenna array and the one or more computer-readable storage media, wherein at least one processor of the one or more processors is to execute the instructions to: control reception of a first set of one or more independent data streams in a downlink channel of a first cell using the first receive antennas; control reception of a second set of one or more independent data streams in a downlink channel of a second cell using the second receive antennas; control reception of control information from a first downlink cell using the first receive antennas or a second downlink cell using the second receive antennas; determine a quasi co-location assumption based on an indication of the control information, wherein the quasi co-location assumption is to be used for estimating channel characteristics for reception of the first set of one or more independent data streams or for reception of the second set of one or more independent data streams; and estimate, using the quasi co-location assumption, channel characteristics for reception of the first set of one or more independent data streams or for reception of the second set of one or more independent data streams.

Example 11 may include the apparatus of example 10 and/or any other one or more examples disclosed herein, wherein at least one independent data stream of the first set of one or more independent data streams corresponds to one layer, and the at least one independent data stream is transmitted by at least one antenna port of a plurality of antenna ports associated with one or more UE-specific reference signals of the first downlink cell, wherein the plurality of antenna ports include antenna ports 7-14.

Example 12 may include the apparatus of example 11 and/or any other one or more examples disclosed herein, wherein the indication is to indicate that the plurality of antenna ports are not assumed to be quasi co-located with respect to Doppler shift, Doppler spread, average delay, and/or delay spread, and a same Doppler shift, Doppler spread, average delay, and delay spread are to be assumed over a predefined set of physical resource blocks (PRBs).

Example 13 may include the apparatus of example 12, wherein the antenna ports of the one or more UE-specific RS antenna ports is quasi co-located with antenna ports associated with one or more other RSs, wherein the one or more other RSs include at least one of cell specific RSs including antenna ports 0-3, channel state information RSs (CSI-RSs) including antenna ports 15-21, or discovery RSs.

Example 14 may include the apparatus of example 11 and/or any other one or more examples disclosed herein, wherein the control information includes an indication of quasi co-location of the plurality of antenna ports associated with the one or more UE-specific reference signals with other reference signals using two or more physical downlink shared channel (PDSCH) resource element (RE) Mapping and Quasi-Co-Location Indicator fields.

Example 15 may include the apparatus of example 11 and/or any other one or more examples disclosed herein, wherein the indication is to indicate quasi co-location of the plurality of antenna ports associated with the one or more UE-specific RSs with other RSs, and the at least one processor of the one or more processors is to execute the instructions to: determine the other RSs using two or more downlink control information formats 2D that include one PDSCH RE Mapping and Quasi-Co-Location Indicator field.

Example 16 may include the apparatus of example 11 and/or any other one or more examples disclosed herein, wherein the indication is to indicate an RE mapping for the one or more independent data streams of the first set of one or more independent data streams and the one or more independent data streams of the second set of one or more independent data streams, and the at least one processor of the one or more processors is to execute the instructions to: determine the RE mapping using two or more PDSCH RE Mapping and Quasi-Co-Location Indicator fields.

Example 17 may include the apparatus of example 10 and/or any other one or more examples disclosed herein, wherein channel state information (CSI) is used by the first downlink cell or the second downlink cell to assist the transmission of the first set of one or more independent data streams or the second set of one or more independent data streams and antenna ports associated with a CSI reference signal (CSI-RS) are not assumed as quasi co-located, and wherein the at least one processor is to execute the instructions to: control reception, in higher layer signaling, of an indication related to aggregation of the antenna ports of the configured CSI-RS that should be used for CSI reporting.

Example 18 may include at least one computer-readable medium including instructions to cause an evolved node B (eNB), in response to execution of the instructions by the eNB, to: cause transmission of a first set of one or more independent data streams in a downlink channel from a first transmission point associated with the eNB, wherein the first transmission point corresponds to a downlink cell and a second transmission point is one of another eNB or a smallcell base station; generate control information that includes an indication of a parameter of at least one of the first set of one or more independent data streams or a second set of one or more independent data streams to be transmitted by the second transmission point in a downlink channel of the second transmission point; and cause transmission of the control information. The at least one computer-readable medium may be a non-transitory computer-readable medium.

Example 19 may include the at least one computer-readable medium of example 18 and/or any other one or more examples disclosed herein, wherein antenna ports associated with a CSI reference signal (CSI-RS) are not assumed as quasi co-located, and wherein the instructions further cause the eNB, in response to execution of the instructions by the eNB, to: use channel state information (CSI) to assist the transmission of the first set of one or more independent data streams; and transmit, in higher layer signaling, an indication related to aggregation of antenna ports of configured CSI-RSs to be used for CSI reporting.

Example 20 may include the at least one computer-readable medium of example 18 and/or any other one or more examples disclosed herein, wherein the instructions further cause the eNB, in response to execution of the instructions by the eNB, to: map one codeword to one transmission layer when two or more downlink control information (DCI) messages are to be used to schedule a physical downlink shared channel (PDSCH).

Example 21 may include the at least one computer-readable medium of example 18 and/or any other one or more examples disclosed herein, wherein the instructions further cause the eNB, in response to execution of the instructions by the eNB, to: map one codeword to two or more transmission layers associated with one or more independent data streams of a first set of one or more independent data streams or map one codeword to two or more layers associated with one or more independent data streams of a second set of one or more independent data streams.

Example 22 may include an apparatus to be implemented in an evolved node B (eNB) comprising: one or more computer-readable storage media having instructions; and one or more processors coupled with an antenna array and the one or more computer-readable storage media, wherein at least one processor of the one or more processors is to execute the instructions to: identify control information related to a parameter of a first independent data stream that is to be transmitted by a downlink cell or a second independent data stream that is to be transmitted by another downlink cell; and cause transmission of the first independent data stream and the control information.

Example 23 may include the apparatus of example 22 and/or any other one or more examples disclosed herein, wherein antenna ports associated with a CSI reference signal (CSI-RS) are not assumed as quasi co-located, and wherein the at least one processor is to execute the instructions to: use channel state information (CSI) to assist the transmission of the first independent data stream; and transmit, in higher layer signaling, an indication related to aggregation of antenna ports of configured CSI-RSs to be used for CSI reporting.

Example 24 may include the apparatus of example 22 and/or any other one or more examples disclosed herein, wherein the at least one processor is to execute the instructions to: map one codeword to one transmission layer when two or more downlink control information (DCI) messages are to be used to schedule a physical downlink shared channel (PDSCH).

Example 25 may include the apparatus of example 22 and/or any other one or more examples disclosed herein, wherein the at least one processor is to execute the instructions to: map one codeword to two or more layers associated with one or more independent data streams including the first independent data stream or map one codeword to two or more layers associated with one or more independent data streams of including the second independent data stream.

Example 26 may include an apparatus to be implemented in a user equipment (UE) comprising: radio frequency (RF) circuitry to receive, in a first downlink channel, a first set of one or more independent data streams received from a first transmission point; receive, in a second downlink channel, a second set of one or more independent data streams from a second transmission point; and receive control information from the first transmission point or the second transmission point; and baseband circuitry to process the first set of one or more independent data streams; process the second set of one or more independent data streams; process the control information to determine a quasi co-location assumption to be used for estimating channel characteristics for reception of the first set of one or more independent data streams or for reception of the second set of one or more independent data streams, wherein the quasi co-location assumption to be used is based on an indication within the control information; and estimate channel characteristics for reception of the first set of one or more independent data streams or for reception of the second set of one or more independent data streams according to the quasi co-location assumption.

Example 27 may include the apparatus of example 26 and/or any other one or more examples disclosed herein, wherein at least one independent data stream of the first set of one or more independent data streams corresponds to a first layer, and the at least one independent data stream is to be transmitted by at least one antenna port of a plurality of antenna ports associated with one or more UE-specific reference signals (RSs) of the first transmission point.

Example 28 may include the apparatus of example 27 and/or any other one or more examples disclosed herein, wherein the indication is to indicate that the plurality of antenna ports are not assumed to be quasi co-located with respect to at least one of a Doppler shift, a Doppler spread, an average delay, or a delay spread.

Example 29 may include the apparatus of example 28 and/or any other one or more examples disclosed herein, wherein a same Doppler shift, Doppler spread, average delay, and delay spread are assumed over a predefined set of physical resource blocks (PRBs).

Example 30 may include the apparatus of example 28 and/or any other one or more examples disclosed herein, wherein the indication is to indicate that antenna ports of the plurality of antenna ports associated with the one or more UE-specific RSs are quasi co-located with one or more antenna ports associated with one or more other RSs.

Example 31 may include the apparatus of example 30 and/or any other one or more examples disclosed herein, wherein the one or more other RSs include one of cell specific RSs (CRSs), channel state information reference signals (CSI-RSs), or discovery RSs.

Example 32 may include the apparatus of example 27 and/or any other one or more examples disclosed herein, wherein the indication is to indicate quasi co-location of antenna ports of the plurality of antenna ports associated with the one or more UE-specific RSs with other RSs, and wherein the baseband circuitry is to determine the one or more other RSs using two or more physical downlink shared channel (PDSCH) resource element (RE) mapping and Quasi Co-Location Indicator fields.

Example 33 may include the apparatus of example 27 and/or any other one or more examples disclosed herein, wherein the indication is to indicate quasi co-location of antenna ports of the plurality of antenna ports associated with the one or more UE-specific RSs with other RSs, and wherein the baseband circuitry is to determine the one or more other RSs using two or more downlink control information (DCI) format 2D messages, wherein each of the two or more DCI format 2D messages include at least one PDSCH RE mapping and Quasi Co-Location Indicator field.

Example 34 may include the apparatus of example 27 and/or any other one or more examples disclosed herein, wherein the indication is to indicate an RE mapping for the one or more independent data streams of the first set of one or more independent data streams and the one or more independent data streams of the second set of one or more independent data streams, and wherein the baseband circuitry is to determine the RE mapping using two or more PDSCH RE Mapping and Quasi-Co-Location Indicator fields.

Example 35 may include a computer-implemented method for providing multi-cell, multi-point single user (SU) multiple input and multiple output (MIMO) transmissions, the method comprising: receiving and processing, by a user equipment (UE), a first set of one or more independent data streams received in a downlink channel from a first transmission point; receiving and processing, by the UE, a second set of one or more independent data streams received in a downlink channel from a second transmission point; receiving and processing, by the UE, control information received from the first transmission point or the second transmission point; determining, by the UE, a quasi co-location assumption to be used for estimating channel characteristics for reception of the first set of one or more independent data streams or for reception of the second set of one or more independent data streams, wherein the quasi co-location assumption to be used is based on an indication within the control information; and estimating, by the UE, channel characteristics for reception of the first set of one or more independent data streams or for reception of the second set of one or more independent data streams according to the quasi co-location assumption.

Example 36 may include the method of example 35 and/or any other one or more examples disclosed herein, wherein at least one independent data stream of the first set of one or more independent data streams corresponds to a first layer, and the at least one independent data stream is to be transmitted by at least one antenna port of a plurality of antenna ports associated with one or more UE-specific reference signals (RSs) of the first transmission point.

Example 37 may include the method of example 36 and/or any other one or more examples disclosed herein, wherein the indication indicates that the plurality of antenna ports are not assumed to be quasi co-located with respect to at least one of a Doppler shift, a Doppler spread, an average delay, or a delay spread.

Example 38 may include the method of example 37 and/or any other one or more examples disclosed herein, wherein a same Doppler shift, Doppler spread, average delay, and delay spread are assumed over a predefined set of physical resource blocks (PRBs).

Example 39 may include the method of example 37 and/or any other one or more examples disclosed herein, wherein the indication indicates that antenna ports of the plurality of antenna ports associated with the one or more UE-specific RSs are quasi co-located with one or more antenna ports associated with one or more other RSs.

Example 40 may include the method of example 39, wherein the one or more other RSs include one of cell specific RSs (CRSS), channel state information reference signals (CSI-RSs), or discovery RSs.

Example 41 may include the method of example 36 and/or any other one or more examples disclosed herein, wherein the indication indicates quasi co-location of antenna ports of the plurality of antenna ports associated with the one or more UE-specific RSs with other RSs, and the method further comprises: determining, by the UE, the one or more other RSs using two or more physical downlink shared channel (PDSCH) resource element (RE) mapping and Quasi Co-Location Indicator fields.

Example 42 may include the method of example 36 and/or any other one or more examples disclosed herein, wherein the indication indicates quasi co-location of antenna ports of the plurality of antenna ports associated with the one or more UE-specific RSs with other RSs, and the method further comprises: determining, by the UE, the one or more other RSs using two or more downlink control information (DCI) format 2D messages, wherein each of the two or more DCI format 2D messages include at least one PDSCH RE mapping and Quasi Co-Location Indicator field.

Example 43 may include the method of example 36 and/or any other one or more examples disclosed herein, wherein the indication indicates an RE mapping for the one or more independent data streams of the first set of one or more independent data streams and the one or more independent data streams of the second set of one or more independent data streams, and the method further comprises: determining, by the UE, the RE mapping using two or more PDSCH RE Mapping and Quasi-Co-Location Indicator fields.

Example 44 may include at least one computer-readable medium including instructions to cause a user equipment (UE), in response to execution of the instructions by the UE, to perform the method of any one of examples 35-43 and/or any other one or more examples disclosed herein. The at least one computer-readable medium may be a non-transitory computer-readable medium.

Example 45 may include an apparatus to be implemented in a user equipment (UE) comprising: an antenna array that includes at least a first receive antenna and a second receive antenna; radio frequency (RF) circuitry coupled with the antenna array, the RF circuitry to receive a first set of one or more independent data streams in a downlink channel of a first cell using the first receive antennas; receive a second set of one or more independent data streams in a downlink channel of a second cell using the second receive antennas; and receive control information from a first downlink cell using the first receive antennas or a second downlink cell using the second receive antennas; and baseband circuitry coupled with the RF circuitry, the baseband circuitry to determine a quasi co-location assumption based on an indication of the control information, wherein the quasi co-location assumption to be used for estimating channel characteristics for reception of the first set of one or more independent data streams or for reception of the second set of one or more independent data streams; and estimate, using the quasi co-location assumption, channel characteristics for reception of the first set of one or more independent data streams or for reception of the second set of one or more independent data streams.

Example 46 may include the apparatus of example 45 and/or any other one or more examples disclosed herein, wherein at least one independent data stream of the first set of one or more independent data streams corresponds to one layer, and the at least one independent data stream is transmitted by at least one antenna port of a plurality of antenna ports associated with one or more UE-specific reference signals of the first downlink cell, wherein the plurality of antenna ports include antenna ports 7-14.

Example 47 may include the apparatus of example 46 and/or any other one or more examples disclosed herein, wherein the indication is to indicate that the plurality of antenna ports are not assumed to be quasi co-located with respect to Doppler shift, Doppler spread, average delay, and/or delay spread, and a same Doppler shift, Doppler spread, average delay, and delay spread are to be assumed over a predefined set of physical resource blocks (PRBs).

Example 48 may include the apparatus of example 47 and/or any other one or more examples disclosed herein, wherein the antenna ports of the one or more UE-specific RS antenna ports is quasi co-located with antenna ports associated with one or more other RSs, wherein the one or more other RSs include at least one of cell specific RSs including antenna ports 0-3, channel state information RSs (CSI-RSs) including antenna ports 15-21, or discovery RSs.

Example 49 may include the apparatus of example 46 and/or any other one or more examples disclosed herein, wherein the control information includes an indication of quasi co-location of the plurality of antenna ports associated with the one or more UE-specific reference signals with other reference signals using two or more physical downlink shared channel (PDSCH) resource element (RE) Mapping and Quasi-Co-Location Indicator fields.

Example 50 may include the apparatus of example 46 and/or any other one or more examples disclosed herein, wherein the indication is to indicate quasi co-location of the plurality of antenna ports associated with the one or more UE-specific RSs with other RSs, and the baseband circuitry is to determine the other RSs using two or more downlink control information formats 2D that include one PDSCH RE Mapping and Quasi-Co-Location Indicator field.

Example 51 may include the apparatus of example 46 and/or any other one or more examples disclosed herein, wherein the indication is to indicate an RE mapping for the one or more independent data streams of the first set of one or more independent data streams and the one or more independent data streams of the second set of one or more independent data streams, and the baseband circuitry is to determine the RE mapping using two or more PDSCH RE Mapping and Quasi-Co-Location Indicator fields.

Example 52 may include the apparatus of example 45 and/or any other one or more examples disclosed herein, wherein channel state information (CSI) is used by the first downlink cell or the second downlink cell to assist the transmission of the first set of one or more independent data streams or the second set of one or more independent data streams and antenna ports associated with a CSI reference signal (CSI-RS) are not assumed as quasi co-located, and the baseband circuitry is to control reception, in higher layer signaling, of an indication related to aggregation of the antenna ports of the configured CSI-RS that should be used for CSI reporting.

Example 53 may include a computer-implemented method for providing multi-cell, multi-point single user (SU) multiple input and multiple output (MIMO) transmissions, the method comprising: receiving, by a user equipment (UE), a first set of one or more independent data streams in a downlink channel of a first cell using first receive antennas; receiving, by the UE, a second set of one or more independent data streams in a downlink channel of a second cell using second receive antennas; receiving, by the UE, control information from a first downlink cell using the first receive antennas or a second downlink cell using the second receive antennas; determining, by the UE, a quasi co-location assumption based on an indication of the control information, wherein the quasi co-location assumption to be used for estimating channel characteristics for reception of the first set of one or more independent data streams or for reception of the second set of one or more independent data streams; and estimating, by the UE, using the quasi co-location assumption, channel characteristics for reception of the first set of one or more independent data streams or for reception of the second set of one or more independent data streams.

Example 54 may include the method of example 53 and/or any other one or more examples disclosed herein, wherein at least one independent data stream of the first set of one or more independent data streams corresponds to one layer, and the at least one independent data stream is transmitted by at least one antenna port of a plurality of antenna ports associated with one or more UE-specific reference signals of the first downlink cell, wherein the plurality of antenna ports include antenna ports 7-14.

Example 55 may include the method of example 54 and/or any other one or more examples disclosed herein, wherein the indication is to indicate that the plurality of antenna ports are not assumed to be quasi co-located with respect to Doppler shift, Doppler spread, average delay, and/or delay spread, and a same Doppler shift, Doppler spread, average delay, and delay spread are to be assumed over a predefined set of physical resource blocks (PRBs).

Example 56 may include the method of example 55 and/or any other one or more examples disclosed herein, wherein the antenna ports of the one or more UE-specific RS antenna ports is quasi co-located with antenna ports associated with one or more other RSs, wherein the one or more other RSs include at least one of cell specific RSs including antenna ports 0-3, channel state information RSs (CSI-RSs) including antenna ports 15-21, or discovery RSs.

Example 57 may include the method of example 54 and/or any other one or more examples disclosed herein, wherein the control information includes an indication of quasi co-location of the plurality of antenna ports associated with the one or more UE-specific reference signals with other reference signals using two or more physical downlink shared channel (PDSCH) resource element (RE) Mapping and Quasi-Co-Location Indicator fields.

Example 58 may include the method of example 54 and/or any other one or more examples disclosed herein, wherein the indication is to indicate quasi co-location of the plurality of antenna ports associated with the one or more UE-specific RSs with other RSs, and at least one processor of one or more processors is to execute the instructions to: determine the other RSs using two or more downlink control information formats 2D that include one PDSCH RE Mapping and Quasi-Co-Location Indicator field.

Example 59 may include the method of example 54 and/or any other one or more examples disclosed herein, wherein the indication is to indicate an RE mapping for the one or more independent data streams of the first set of one or more independent data streams and the one or more independent data streams of the second set of one or more independent data streams, and at least one processor of one or more processors is to execute the instructions to: determine the RE mapping using two or more PDSCH RE Mapping and Quasi-Co-Location Indicator fields.

Example 60 may include the method of example 53 and/or any other one or more examples disclosed herein, wherein channel state information (CSI) is used by the first downlink cell or the second downlink cell to assist the transmission of the first set of one or more independent data streams or the second set of one or more independent data streams and antenna.

Example 61 may include at least one computer-readable medium including instructions to cause a user equipment (UE), in response to execution of the instructions by the UE, to perform the method of any one of examples 53-60 and/or any other one or more examples disclosed herein. The at least one computer-readable medium may be a non-transitory computer-readable medium.

Example 62 may include an apparatus to be implemented by an evolved node B (eNB), comprising: one or more computer-readable storage media having instructions; and one or more processors coupled with an antenna array and the one or more computer-readable storage media, wherein at least one processor of the one or more processors is to execute the instructions to: cause transmission of a first set of one or more independent data streams in a downlink channel from a first transmission point associated with the eNB, wherein the first transmission point corresponds to a downlink cell and a second transmission point is one of another eNB or a smallcell base station; generate control information that includes an indication of a parameter of at least one of the first set of one or more independent data streams or a second set of one or more independent data streams to be transmitted by the second transmission point in a downlink channel of the second transmission point; and cause transmission of the control information.

Example 63 may include the apparatus of example 62 and/or any other one or more examples disclosed herein, wherein antenna ports associated with a CSI reference signal (CSI-RS) are not assumed as quasi co-located, and wherein the instructions further cause the eNB, in response to execution of the instructions by the eNB, to: use channel state information (CSI) to assist the transmission of the first set of one or more independent data streams; and transmit, in higher layer signaling, an indication related to aggregation of antenna ports of configured CSI-RSs to be used for CSI reporting.

Example 64 may include the apparatus of example 62 and/or any other one or more examples disclosed herein, wherein the instructions further cause the eNB, in response to execution of the instructions by the eNB, to: map one codeword to one transmission layer when two or more downlink control information (DCI) messages are to be used to schedule a physical downlink shared channel (PDSCH).

Example 65 may include the apparatus of example 62 and/or any other one or more examples disclosed herein, wherein the instructions further cause the eNB, in response to execution of the instructions by the eNB, to: map one codeword to two or more transmission layers associated with one or more independent data streams of the first set of one or more independent data streams or map one codeword to two or more layers associated with one or more independent data streams of the second set of one or more independent data streams.

Example 66 may include an apparatus to be implemented by an evolved node B (eNB), comprising: radio frequency (RF) circuitry to transmit a first set of one or more independent data streams in a downlink channel from a first transmission point associated with the eNB, wherein the first transmission point corresponds to a downlink cell and a second transmission point is one of another eNB or a smallcell base station; and baseband circuitry coupled with the RF circuitry, the baseband circuitry to generate control information that includes an indication of a parameter of at least one of the first set of one or more independent data streams or a second set of one or more independent data streams to be transmitted by the second transmission point in a downlink channel of the second transmission point, and wherein the RF circuitry is to transmit the control information.

Example 67 may include the apparatus of example 66 and/or any other one or more examples disclosed herein, wherein antenna ports associated with a CSI reference signal (CSI-RS) are not assumed as quasi co-located, and wherein the baseband circuitry is to use channel state information (CSI) to assist the transmission of the first set of one or more independent data streams; and cause transmission, in higher layer signaling, of an indication related to aggregation of antenna ports of configured CSI-RSs to be used for CSI reporting.

Example 68 may include the apparatus of example 66 and/or any other one or more examples disclosed herein, wherein the baseband circuitry is to map one codeword to one transmission layer when two or more downlink control information (DCI) messages are to be used to schedule a physical downlink shared channel (PDSCH).

Example 69 may include the apparatus of example 66 and/or any other one or more examples disclosed herein, wherein the baseband circuitry is to map one codeword to two or more transmission layers associated with one or more independent data streams of the first set of one or more independent data streams or map one codeword to two or more layers associated with one or more independent data streams of the second set of one or more independent data streams.

Example 70 may include an apparatus to be implemented in an evolved node B (eNB) comprising: baseband circuitry to identify control information related to a parameter of a first independent data stream that is to be transmitted by a downlink cell or a second independent data stream that is to be transmitted by another downlink cell; and cause transmission of the first independent data stream and the control information; and radio frequency (RF) circuitry coupled with the baseband circuitry, the RF circuitry to transmit the first independent data stream and the control information.

Example 71 may include the apparatus of example 70 and/or any other one or more examples disclosed herein, wherein antenna ports associated with a CSI reference signal (CSI-RS) are not assumed as quasi co-located, and wherein the baseband circuitry is to use channel state information (CSI) to assist the transmission of the first independent data stream; and the RF circuitry is to transmit, in higher layer signaling, an indication related to aggregation of antenna ports of configured CSI-RSs to be used for CSI reporting.

Example 72 may include the apparatus of example 70 and/or any other one or more examples disclosed herein, wherein the baseband circuitry is to map one codeword to one transmission layer when two or more downlink control information (DCI) messages are to be used to schedule a physical downlink shared channel (PDSCH).

Example 73 may include the apparatus of example 70 and/or any other one or more examples disclosed herein, wherein the baseband circuitry is to map one codeword to two or more layers associated with one or more independent data streams including the first independent data stream or map one codeword to two or more layers associated with one or more independent data streams of including the second independent data stream.

Example 74 may include at least one computer-readable medium including instructions to cause an evolved node B (eNB), in response to execution of the instructions by the eNB, to: identify control information related to a parameter of a first independent data stream that is to be transmitted by a downlink cell or a second independent data stream that is to be transmitted by another downlink cell; and cause transmission of the first independent data stream and the control information. The at least one computer-readable medium may be a non-transitory computer-readable medium.

Example 75 may include the at least one computer-readable medium of example 74 and/or any other one or more examples disclosed herein, wherein antenna ports associated with a CSI reference signal (CSI-RS) are not assumed as quasi co-located, and wherein at least one processor is to execute the instructions to: use channel state information (CSI) to assist the transmission of the first independent data stream; and transmit, in higher layer signaling, an indication related to aggregation of antenna ports of configured CSI-RSs to be used for CSI reporting.

Example 76 may include the at least one computer-readable medium of example 74 and/or any other one or more examples disclosed herein, wherein at least one processor is to execute the instructions to: map one codeword to one transmission layer when two or more downlink control information (DCI) messages are to be used to schedule a physical downlink shared channel (PDSCH).

Example 77 may include the at least one computer-readable medium of example 74 and/or any other one or more examples disclosed herein, wherein the at least one processor is to execute the instructions to: map one codeword to two or more layers associated with one or more independent data streams including the first independent data stream or map one codeword to two or more layers associated with one or more independent data streams of including the second independent data stream.

Example 78 may include a computer-implemented method for providing multi-cell, multi-point single user (SU) multiple input and multiple output (MIMO) transmissions, the method comprising: transmitting, by an evolved node B (eNB), a first set of one or more independent data streams in a downlink channel from a first transmission point associated with the eNB, wherein the first transmission point corresponds to a downlink cell and a second transmission point is one of another eNB or a smallcell base station;

generating, by the eNB, control information that includes an indication of a parameter of at least one of the first set of one or more independent data streams or a second set of one or more independent data streams to be transmitted by the second transmission point in a downlink channel of the second transmission point; and transmitting, by the eNB, the control information.

Example 79 may include the method of example 78 and/or any other one or more examples disclosed herein, wherein antenna ports associated with a CSI reference signal (CSI-RS) are not assumed as quasi co-located, and further comprising: using, by the eNB, channel state information (CSI) to assist the transmission of the first set of one or more independent data streams; and transmitting, by the eNB in higher layer signaling, an indication related to aggregation of antenna ports of configured CSI-RSs to be used for CSI reporting.

Example 80 may include the method of example 78 and/or any other one or more examples disclosed herein, further comprising: mapping, by the eNB, one codeword to one transmission layer when two or more downlink control information (DCI) messages are to be used to schedule a physical downlink shared channel (PDSCH).

Example 81 may include the method of example 78 and/or any other one or more examples disclosed herein, further comprising: mapping, by the eNB, one codeword to two or more transmission layers associated with one or more independent data streams of the first set of one or more independent data streams or mapping one codeword to two or more layers associated with one or more independent data streams of the second set of one or more independent data streams.

Example 82 may include at least one computer-readable medium including instructions to cause an evolved node B (eNB), in response to execution of the instructions by the eNB, to perform the method of any one of examples 78-81 and/or any other one or more examples disclosed herein. The at least one computer-readable medium may be a non-transitory computer-readable medium.

Example 83 may include the computer-implemented method for providing multi-cell, multi-point single user (SU) multiple input and multiple output (MIMO) transmissions, the method comprising: identifying, by an evolved node B (eNB), control information related to a parameter of a first independent data stream that is to be transmitted by a downlink cell or a second independent data stream that is to be transmitted by another downlink cell; and transmitting, by the eNB, the first independent data stream and the control information.

Example 84 may include the method of example 82 and/or any other one or more examples disclosed herein, wherein antenna ports associated with a CSI reference signal (CSI-RS) are not assumed as quasi co-located, and the method further comprises: using, by the eNB, channel state information (CSI) to assist the transmission of the first independent data stream; and transmitting, by the eNB in higher layer signaling, an indication related to aggregation of antenna ports of configured CSI-RSs to be used for CSI reporting.

Example 85 may include the method of example 82 and/or any other one or more examples disclosed herein, further comprising: mapping, by the eNB, one codeword to one transmission layer when two or more downlink control information (DCI) messages are to be used to schedule a physical downlink shared channel (PDSCH).

Example 86 may include the method of example 82 and/or any other one or more examples disclosed herein, further comprising: mapping, by the eNB, one codeword to two or more layers associated with one or more independent data streams including the first independent data stream or mapping one codeword to two or more layers associated with one or more independent data streams of including the second independent data stream.

Example 87 may include at least one computer-readable medium including instructions to cause an evolved node B (eNB), in response to execution of the instructions by the eNB, to perform the method of any one of examples 83-86 and/or any other one or more examples disclosed herein. The at least one computer-readable medium may be a non-transitory computer-readable medium.

The foregoing description of the above Examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the invention.

The invention claimed is:

1. At least one non-transitory, computer-readable medium including instructions that, when executed by one or more processors, cause a user equipment (UE) to:
   process a first set of one or more independent data streams received in a downlink channel from a first transmission point;
   process a second set of one or more independent data streams received in a downlink channel from a second transmission point;
   process control information received from the first transmission point or the second transmission point;
   determine a quasi co-location assumption to be used for estimating channel characteristics for reception of the first set of one or more independent data streams or for reception of the second set of one or more independent data streams, wherein the quasi co-location assumption to be used is based on an indication within the control information; and
   estimate channel characteristics for reception of the first set of one or more independent data streams or for reception of the second set of one or more independent data streams according to the quasi co-location assumption.

2. The at least one non-transitory, computer-readable medium of claim 1, wherein at least one independent data stream of the first set of one or more independent data streams corresponds to a first layer, and the at least one independent data stream is to be transmitted by at least one antenna port of a plurality of antenna ports associated with one or more DE-specific reference signals (RSs) of the first transmission point.

3. The at least one non-transitory, computer-readable medium of claim 2, wherein the indication is to indicate that the plurality of antenna ports are not assumed to be quasi co-located with respect to at least one of a Doppler shift, a Doppler spread, an average delay, or a delay spread.

4. The at least one non-transitory, computer-readable medium of claim 3, wherein a same Doppler shift, Doppler spread, average delay, and delay spread are assumed over a predefined set of physical resource blocks (PRBs).

5. The at least one non-transitory, computer-readable medium of claim 3, wherein the indication is to indicate that antenna ports of the plurality of antenna ports associated with the one or more DE-specific RSs are quasi co-located with one or more antenna ports associated with one or more other RSs.

6. The at least one non-transitory, computer-readable medium of claim 5, wherein the one or more other RSs include one of cell specific RSs (CRSS), channel state information reference signals (CSI-RSs), or discovery RSs.

7. The at least one non-transitory, computer-readable medium of claim 2, wherein the indication is to indicate quasi co-location of antenna ports of the plurality of antenna ports associated with the one or more DE-specific RSs with other RSs, and wherein the instructions, when executed by the one or more processors, cause the DE to:
  determine the one or more other RSs using two or more physical downlink shared channel (PDSCH) resource element (RE) mapping and Quasi Co-Location Indicator fields.

8. The at least one non-transitory, computer-readable medium of claim 2, wherein the indication is to indicate quasi co-location of antenna ports of the plurality of antenna ports associated with the one or more DE-specific RSs with other RSs, and wherein the instructions, when executed by the one or more processors, cause the DE to:
  determine the one or more other RSs using two or more downlink control information (DCI) format 2D messages, wherein each of the two or more DCI format 2D messages include at least one PDSCH RE mapping and Quasi Co-Location Indicator field.

9. The at least one non-transitory, computer-readable medium of claim 2, wherein the indication is to indicate an RE mapping for the one or more independent data streams of the first set of one or more independent data streams and the one or more independent data streams of the second set of one or more independent data streams, and wherein the instructions, when executed by the one or more processors, cause the UE to:
  determine the RE mapping using two or more PDSCH RE Mapping and Quasi-Co-Location Indicator fields.

10. An apparatus to be implemented in a user equipment (UE) comprising:
  an antenna array that includes at least a first receive antenna and a second receive antenna;
  one or more computer-readable storage media having instructions; and
  one or more processors coupled with the antenna array and the one or more computer-readable storage media, wherein at least one processor of the one or more processors is to execute the instructions to:
    control reception of a first set of one or more independent data streams m a downlink channel of a first cell using the first receive antennas;
    control reception of a second set of one or more independent data streams in a downlink channel of a second cell using the second receive antennas;
    control reception of control information from a first downlink cell using the first receive antennas or a second downlink cell using the second receive antennas;
    determine a quasi co-location assumption based on an indication of the control information, wherein the quasi co-location assumption to be used for estimating channel characteristics for reception of the first set of one or more independent data streams or for reception of the second set of one or more independent data streams; and
    estimate, using the quasi co-location assumption, channel characteristics for reception of the first set of one or more independent data streams or for reception of the second set of one or more independent data streams.

11. The apparatus of claim 10, wherein at least one independent data stream of the first set of one or more independent data streams corresponds to one layer, and the at least one independent data stream is transmitted by at least one antenna port of a plurality of antenna ports associated with one or more DE-specific reference signals of the first downlink cell, wherein the plurality of antenna ports include antenna ports 7-14.

12. The apparatus of claim 11, wherein the indication is to indicate that the plurality of antenna ports are not assumed to be quasi co-located with respect to Doppler shift, Doppler spread, average delay, and/or delay spread, and a same Doppler shift, Doppler spread, average delay, and delay spread are to be assumed over a predefined set of physical resource blocks (PRBs).

13. The apparatus of claim 12, wherein the antenna ports of the one or more DE-specific RS antenna ports is quasi co-located with antenna ports associated with one or more other RSs, wherein the one or more other RSs include at least one of cell specific RSs including antenna ports 0-3, channel state information RSs (CSI-RSs) including antenna ports 15-21, or discovery RSs.

14. The apparatus of claim 11, wherein the control information includes an indication of quasi co-location of the plurality of antenna ports associated with the one or more DE-specific reference signals with other reference signals using two or more physical downlink shared channel (PDSCH) resource element (RE) Mapping and Quasi-Co-Location Indicator fields.

15. The apparatus of claim 11, wherein the indication is to indicate quasi co-location of the plurality of antenna ports associated with the one or more DE-specific RSs with other RSs, and the at least one processor of the one or more processors is to execute the instructions to:
  determine the other RSs using two or more downlink control information formats 2D that include one PDSCH RE Mapping and Quasi-Co-Location Indicator field.

16. The apparatus of claim 11, wherein the indication is to indicate an RE mapping for the one or more independent data streams of the first set of one or more independent data streams and the one or more independent data streams of the second set of one or more independent data streams, and the at least one processor of the one or more processors is to execute the instructions to:
  determine the RE mapping using two or more PDSCH RE Mapping and Quasi-Co-Location Indicator fields.

17. The apparatus of claim 10, wherein channel state information (CSI) is used by the first downlink cell or the second downlink cell to assist the transmission of the first set of one or more independent data streams or the second set of one or more independent data streams and antenna ports associated with a CSI reference signal (CSI-RS) are not assumed as quasi co-located, and wherein the at least one processor is to execute the instructions to:
  control reception, in higher layer signaling, of an indication related to aggregation of the antenna ports of the configured CSI-RS that should be used for CSI reporting.

18. At least one non-transitory, computer-readable medium including instructions to cause an evolved node B (eNB), in response to execution of the instructions by the eNB, to:

cause transmission of a first set of one or more independent data streams in a downlink channel from a first transmission point associated with the eNB, wherein the first transmission point corresponds to a downlink cell and a second transmission point is one of another eNB or a smallcell base station;

generate control information that includes an indication of a parameter of at least one of the first set of one or more independent data streams or a second set of one or more independent data streams to be transmitted by the second transmission point in a downlink channel of the second transmission point; and cause transmission of the control information, wherein the control information causes a user equipment (UE) to:
 determine a quasi co-location assumption to be used for estimating channel characteristics for reception of the first set of one or more independent data streams or for reception of the second set of one or more independent data streams, wherein the quasi co-location assumption to be used is based on an indication within the control information; and
 estimate channel characteristics for reception of the first set of one or more independent data streams or for reception of the second set of one or more independent data streams according to the quasi co-location assumption.

19. The at least one non-transitory, computer-readable medium of claim 18, wherein antenna ports associated with a CSI reference signal (CSI-RS) are not assumed as quasi co-located, and wherein the instructions further cause the eNB, in response to execution of the instructions by the eNB, to:
 use channel state information (CSI) to assist the transmission of the first set of one or more independent data streams; and
 transmit, in higher layer signaling, an indication related to aggregation of antenna ports of configured CSI-RSs to be used for CSI reporting.

20. The at least one non-transitory, computer-readable medium of claim 18, wherein the instructions further cause the eNB, in response to execution of the instructions by the eNB, to:
 map one codeword to one transmission layer when two or more downlink control information (DCI) messages are to be used to schedule a physical downlink shared channel (PD SCH).

21. The at least one non-transitory, computer-readable medium of claim 18, wherein the instructions further cause the eNB, in response to execution of the instructions by the eNB, to:
 map one codeword to two or more transmission layers associated with one or more independent data streams of the first set of one or more independent data streams or map one codeword to two or more layers associated with one or more independent data streams of the second set of one or more independent data streams.

22. An apparatus to be implemented in an evolved node B (eNB) comprising:
 one or more computer-readable storage media having instructions; and
 one or more processors coupled with an antenna array and the one or more computer-readable storage media, wherein at least one processor of the one or more processors is to execute the instructions to:
  identify control information related to a parameter of a first independent data stream that is to be transmitted by a downlink cell or a second independent data stream that is to be transmitted by one of another eNB or a smallcell base station; and
 cause transmission of the first independent data stream and the control information wherein the control information causes a user equipment (UE) to:
  determine a quasi co-location assumption to be used for estimating channel characteristics for reception of the first independent data stream or for reception of the second independent data stream, wherein the quasi co-location assumption to be used is based on an indication within the control information; and
  estimate channel characteristics for reception of the first independent data stream or for reception of the second independent data stream according to the quasi co-location assumption.

23. The apparatus of claim 22, wherein antenna ports associated with a CSI reference signal (CSI-RS) are not assumed as quasi co-located, and wherein the at least one processor is to execute the instructions to:
 use channel state information (CSI) to assist the transmission of the first independent data stream; and
 transmit, in higher layer signaling, an indication related to aggregation of antenna ports of configured CSI-RSs to be used for CSI reporting.

24. The apparatus of claim 22, wherein the at least one processor is to execute the instructions to:
 map one codeword to one transmission layer when two or more downlink control information (DCI) messages are to be used to schedule a physical downlink shared channel (PD SCH).

25. The apparatus of claim 22, wherein the at least one processor is to execute the instructions to:
 map one codeword to two or more layers associated with one or more independent data streams including the first independent data stream or map one codeword to two or more layers associated with one or more independent data streams of including the second independent data stream.

* * * * *

UNITED STATES PATENT AND TRADEMARK OFFICE
CERTIFICATE OF CORRECTION

PATENT NO. : 10,862,645 B2  
APPLICATION NO. : 16/408107  
DATED : December 8, 2020  
INVENTOR(S) : Alexei Davydov et al.

Page 1 of 2

It is certified that error appears in the above-identified patent and that said Letters Patent is hereby corrected as shown below:

On the Title Page

Column 1, following item [72], Inventors, Line 2-3, delete "Nizhny Novogorod" and insert -- Nizhny Novgorod --;

Column 1, following item [72], Inventors, Line 4, delete "Nizhny Novogorod" and insert -- Nizhny Novgorod --;

In the Claims

Column 36, Line 54, in Claim 2, delete "DE-specific" and insert -- UE-specific --;

Column 37, Line 1, in Claim 5, delete "DE-specific" and insert -- UE-specific --;

Column 37, Line 6, in Claim 6, delete "(CRSS)," and insert -- (CRSs), --;

Column 37, Line 11, in Claim 7, delete "DE-specific" and insert -- UE-specific --;

Column 37, Line 13, in Claim 7, delete "DE" and insert -- UE --;

Column 37, Line 21, in Claim 8, delete "DE-specific" and insert -- UE-specific --;

Column 37, Line 23, in Claim 8, delete "DE" and insert -- UE --;

Column 38, Line 9, in Claim 11, delete "DE-specific" and insert -- UE-specific --;

Column 38, Line 21, in Claim 13, delete "DE-specific" and insert -- UE-specific --;

Column 38, Line 30, in Claim 14, delete "DE-specific" and insert -- UE-specific --;

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,862,645 B2

Column 38, Line 36, in Claim 15, delete "DE- specific" and insert -- UE-specific --;

Column 39, Line 46, in Claim 20, delete "(PD SCH)." and insert -- (PDSCH). --; and Column 40, Line 44, in Claim 24, delete "(PD SCH)." and insert -- (PDSCH). --.